United States Patent [19]

Kaku et al.

[11] Patent Number: 4,807,043

[45] Date of Patent: Feb. 21, 1989

[54] TWO-DIMENSIONAL FACSIMILE ENCODING APPARATUS WITH CODING AND REFERENCE LINE WINDOWING MEANS AND COLOR CHANGE DETECTORS

[75] Inventors: Shinkyo Kaku, Los Gatos; Chung-Li Yu, San Jose, both of Calif.

[73] Assignee: Advanced Micro Devices, Inc., Sunnyvale, Calif.

[21] Appl. No.: 29,832

[22] Filed: Mar. 24, 1987

[51] Int. Cl.[4] .............................................. H04N 1/413
[52] U.S. Cl. ................................. 358/261.3; 358/260
[58] Field of Search ................................ 358/260, 261

[56] References Cited

U.S. PATENT DOCUMENTS

| 4,245,257 | 1/1981 | Yamazaki et al. | 358/261 |
| 4,486,784 | 12/1984 | Abraham et al. | 358/261 |
| 4,509,194 | 4/1985 | Harrington | 358/261 |
| 4,542,413 | 9/1985 | Rallapalli et al. | 358/261 |
| 4,558,371 | 12/1985 | Rallapalli et al. | 358/261 |
| 4,562,484 | 12/1985 | Rallapalli et al. | 358/261 |
| 4,590,521 | 5/1986 | Rallapalli et al. | 358/261 |

FOREIGN PATENT DOCUMENTS

| 60-194671 | 10/1985 | Japan | 358/261 |
| 60-194672 | 10/1985 | Japan | 358/261 |
| 2159364 | 11/1985 | United Kingdom | 358/261 |

OTHER PUBLICATIONS

John R. Mick, "Am 25510 Four-Bit Shifter", *Bipolar Microprocessor Logic and Interface*, Am 2900 Family, 1983 Data Book, Advanced Micro Devices, Inc., 1983, pp. 9-25 to 9-34.

Warren Miller, "Four-Bit Slice Registered Barrel Shifter", *Programmable Array Logic Handbook*, Advanced Micro Devices, Inc., 1983, pp. 5-1 to 5-7.

Bob Bailey and Jeff Neihaus, "Barrel Shifters Speed Data-Bit Manipulations", *Integrated Circuits Magazine*, Jan./Feb. 1984, pp. 34-36, 38, 40.

Lance A. Glasser, *The Design and Analysis of VLSI Circuits*, Addison-Wesley, 1985, pp. 417-418.

Franaszek, P.A., "Sequence-State Methods for Run-Length-Limited Coding", *IBM Journal of Research Development*, Jul. 1970, pp. 376-383.

Primary Examiner—James J. Groody
Assistant Examiner—Randall S. Svihla
Attorney, Agent, or Firm—Fliesler, Dubb, Meyer & Lovejoy

[57] ABSTRACT

Binary image data is converted to CCITT standardized coded data by utilizing two barrel shift registers for selecting a window of image data from a reference line and from a coding line, two color changing detectors for converting the image data in a window to color changing codes, and one specially designed state machine for generating facsimile coded data from those color changing codes. The state machine operates on color change location data for the selected window to generate intermediate codes. The intermediate codes are then translated to an output format such as the CCITT standard.

20 Claims, 12 Drawing Sheets

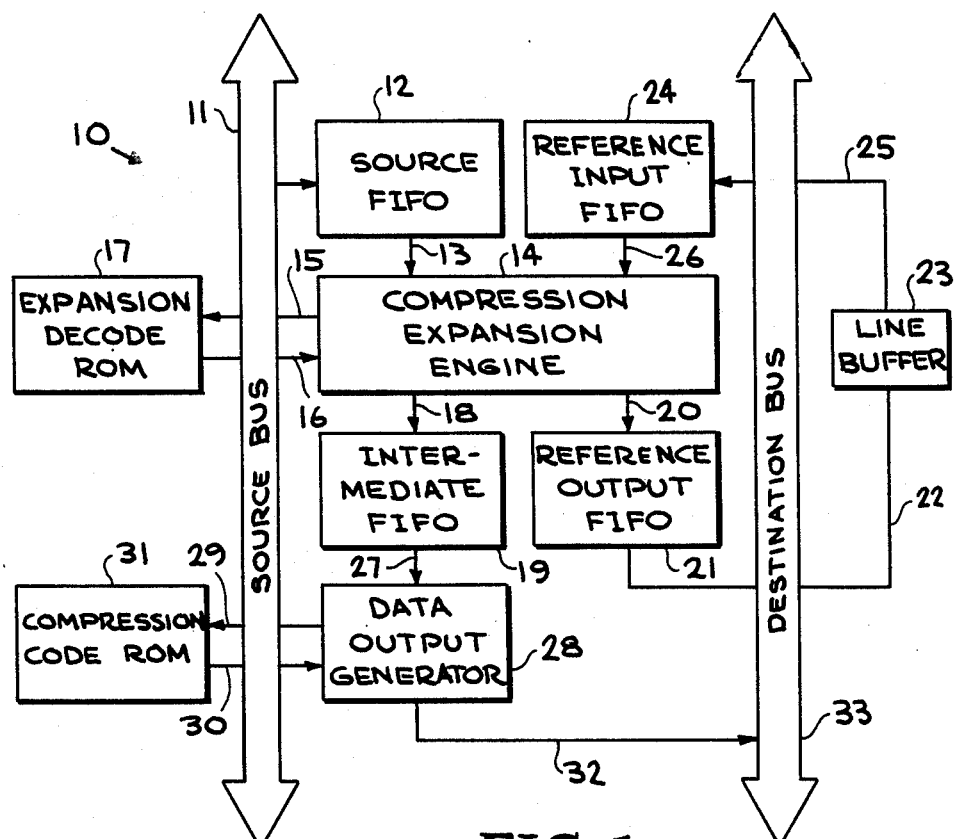

TWO-DIMENSIONAL FACSIMILE ENCODING APPARATUS WITH CODING AND REFERENCE LINE WINDOWING MEANS AND COLOR CHANGE DETECTORS

FIELD OF THE INVENTION

The present invention relates to encoding apparatus for compressing digital facsimiles of graphic images for digital communication or storage.

BACKGROUND OF THE INVENTION

A need for data compression arises in many types of systems which process graphic images. Such systems include digital facsimile machines, electronic mail systems, digital copiers, graphic work stations and storage and retrieval systems. Thus the problem of encoding data representing a graphic image in order to accomplish compression arises in many environments.

A digital facsimile system, in which the preferred embodiment of the present invention is implemented, is an information communication machine by which picture information is transmitted from one location to another location over a communication link such as a telephone line. Typically, in facsimile systems, a scanner generates a facsimile of a graphic image by scanning the original image, such as on a document, on a line-by-line basis, each line including a large number of picture elements. The generated facsimile is then encoded by either a one-dimensional or a two-dimensional coding scheme to compress the image data to reduce the bandwidth or transmission time required for communicating the facsimile. The compressed data is then transmitted over communication links to remote facsimile machines. The remote facsimile machine decodes the compressed data to regenerate the facsimile and reproduces the original graphic image.

One-dimensional coding schemes are based upon the correlation of picture elements along a given scan line in the horizontal direction, whereas two-dimensional coding schemes are based upon a vertical correlation between successive scan lines in addition to the horizontal correlation. Both one-dimensional and two-dimensional schemes have been standardized by the International Telegraph and Telephone Consultative Committee (CCITT). The CCITT standards set forth in Recommendations T.4 and T.6 define a standard coding scheme for Group 3 and Group 4 facsimile apparatus. The recommendations of the CCITT have established compatibility among manufacturers of facsimile equipment for communication of encoded facsimile data.

The CCITT Group 3 apparatus uses a modified Huffman (MH) coding scheme for one-dimensional coding and a modified Relative Element Address Designate (MR) coding scheme for two-dimensional coding. The CCITT Group 4 apparatus uses a modified MR (MMR) coding scheme for two-dimensional coding. The one-dimensional MH coding method uses Huffman codes for the run length of black or white picture elements (PELs).

The two-dimensional coding method encodes the picture by using not only the current line information but also the previous line information. This method is a line-by-line coding method in which the position of each changing PEL on the coding line is coded with respect to the position of a corresponding reference PEL situated on either the coding line or a reference line. Based on the relative position of changing PELs, three coding modes are defined in the CCITT standards: Pass mode, Vertical mode and Horizontal mode.

For the two-dimensional coding, the CCITT standard identifies five color changing elements, a0, a1, a2, b1 and b2, which are elements whose "color" differs from that of the previous adjacent element along the same scan line. The a0 is the reference or starting element on the coding line. At the start of the coding line a0 is set on an imaginary white changing element situated just before the first element on the line. During the coding of the coding line, the position of a0 is defined by the previous coding mode. The a1 is the next changing element to the right of a0 on the coding line. The a2 is the next changing element to the right of a1 on the coding line. The b1 is the first changing element on the reference line to the right of a0 and of the opposite color to a0. The b2 is the next changing element to the right of b1 on the reference line.

The pass mode is identified when the position of b2 lies to the left of a1. When this mode has been coded, the picture element just under b2 is regarded as the new starting picture element a0 for the next coding. However, the state where b2 occurs just above a1 is not considered as a pass mode. If it is not a pass mode and the relative distance of a1b1 is less than or equal to three, then a vertical mode is identified. The relative distance a1b1 can take on one of seven values V(0), VR(1), VR(2), VR(3), VL(1), VL(2), and VL(3), each of which is represented by a separate code word. After the vertical mode has been coded, position a1 is regarded as the new starting picture element a0 for the next coding. Also, if it is not a pass mode and the relative distance of a1b1 is greater than three, then a horizontal mode is identified. When this mode is identified, both the run-lengths a0a1 and a1a2 are coded using the code words H+M(a0a1)+M(a1a2), where M(X) is a standard run-length code. After the horizontal mode has been coded, position a2 is regarded as the new starting picture element a0 for the next coding.

DESCRIPTION OF THE PRIOR ART

In the prior art, image data is converted into coded data by encoding logic one bit or PEL at a time. The processing of data one bit at a time is an obstacle to high speed operation. For example, in U.S. Pat. No. 4,509,194, issued Apr. 2, 1985 to John A. Harrington, a state machine is designed to receive serial binary information one bit at a time. The color change in the binary picture information is detected by the state machine. Because the input data is the binary picture information, the information that can be contained in each state of the state machine is very limited, e.g., only the information of three prior picture elements is contained in each state of his state machine. Further, the state transition of the state machine is based on the one-bit-per-cycle coding line picture data.

Most of the coding schemes in the prior art implementing the CCITT Group 3 standard require the detection of the color changing elements a1, a2, b1 and b2, the calculation of the distance between a1–b1, a0–a1 and a1–a2, and the comparison of a1 with b2 for Pass mode and a1 with b0 for determining the next b1 in VL mode. For example, in U.S. Pat. No. 4,245,257, issued Jan. 13, 1981 to Y. Yamazaki et al., the calculation of distance a0–a1, a1–b1, b2–a2 and the detection of a1, a2, b1 and b2 is necessary. Those requirements result in an extremely complicated logic design. To achieve high speed coding, multiple ALUs are required to perform those operations in pipeline or parallel. If the coding scheme is designed with a single ALU and controlled by microcode or a state machine, these accumulation, comparison and calculation operations must be performed serially, significantly limiting overall performance.

In the prior art all the color changing elements a0, a1, a2, b1 and b2 are referred to a reference point at the beginning of each scan line. For this reason the prior art requires at least an ALU for accumulating color changing run-lengths to get the next color changing element. An example of a system based on the accumulation of run-lengths of color units previous to color change picture elements is described in U.S. Pat. No. 4,558,371, entitled METHOD AND DEVICE FOR TWO-DIMENSIONAL FACSIMILE CODING, inventors Krishna Rallapalli and Shinkyo Kaku, issued Dec. 10, 1985.

SUMMARY OF THE INVENTION

The present invention provides an apparatus for performing two-dimensional facsimile coding according to the international standards. However, the present invention offers a large improvement in speed over the prior art. Further, the apparatus provided by the present invention presents a very compact architecture that permits efficient realization of the coding device.

In one aspect, the present invention is an apparatus for encoding a facsimile of a graphic image where the facsimile is represented by a plurality of scan lines, each scan line being represented by a plurality of picture elements which are characterized by pixel data indicating a color of the picture element. The apparatus comprises windowing means, connected to receive the pixel data characterizing picture elements from a coding line and a reference line of the facsimile and responsive to control signals, for selecting a window of pixel data. A means responsive to the selected window of pixel data generates an intermediate code and the window control signals for selection of a following window in the encoding process. A coding means is provided that is responsive to the intermediate codes for supplying the codes that encode the facsimile according to the selected standard.

In a second aspect of the invention, a color change detecting means for generating color change signals that indicate the position of color changing picture elements within the selected window in the coding line and in the reference line are used in the generation of the intermediate codes. The color change signals are then supplied to a logic means for generating an intermediate code for the selected window and a window control signal identifying the next window to be selected.

The means for supplying the codes for encoding the facsimile is implemented as table look-up mechanism that is addressable by the intermediate codes to provide the appropriate international standard code.

BRIEF DESCRIPTION OF THE FIGURES

FIG. 1 is a block diagram of an encoding apparatus according to the present invention.

FIG. 3 is a detailed block diagram of the color change detector (CUCCD or RUCCD) in the compression engine shown in FIGS. 2A-2B.

DETAILED DESCRIPTION

Figures 2A, 2B:
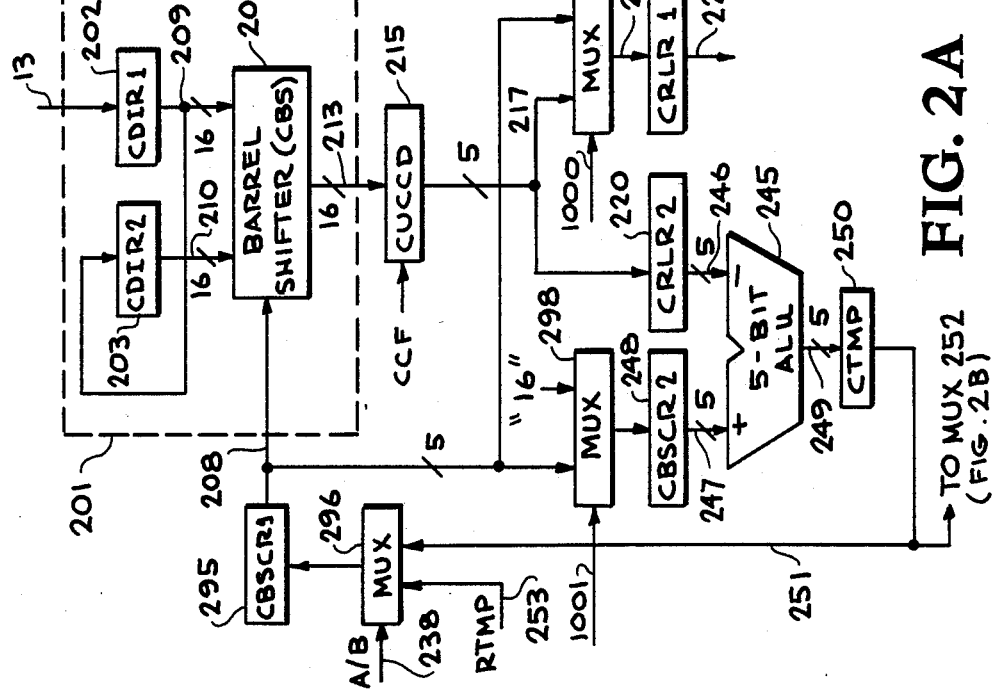
FIGS. 2A through 2C provide a detailed block diagram of the compression engine of the encoding apparatus shown in FIG. 1.

With reference to FIGS. 1, 2A-2C, 3, 4 and 5, a detailed description of the preferred implementation of the present invention is provided. With reference to FIGS. 6A-6H, 7A-7G, 8A-8E, 9A-9E, 10A-10B, 11A-11C and 12 and logic tables provided in the specification, the operation of the preferred implementation is described.

I. Encoding System Overview

FIG. 1 provides a block diagram of an encoding apparatus 10 according to the present invention. The apparatus 10 includes a source bus 11 on which lines of pixel data characterizing a facsimile of a graphic image are supplied. The pixel data are supplied from the source bus 11 to a source first-in-first-out (FIFO) buffer 12. From the source FIFO buffer 12, the pixel data is supplied across line 13 to a compression/expansion engine 14. The compression/expansion engine 14 communicates across lines 15 and 16 with an expansion decode ROM 17. The expansion engine and expansion decode ROM are not important to the present invention and are not further described herein. An overall system for facsimile encoding and decoding would include the expansion engine and expansion decode ROM as is known in the art.

An intermediate code output of the compression/expansion engine 14 is provided across line 18 to an intermediate FIFO buffer 19. In addition, the compression/expansion engine supplies a reference output on line 20 to a reference output FIFO buffer 21. The reference output FIFO buffer supplies reference lines across line 22 to a line buffer 23. The line buffer is connected to a reference input FIFO buffer 24 across line 25. The reference input FIFO buffer 24 supplies a reference line pixel data across line 26 to the compression/expansion engine 14 for use in generation of the intermediate code output on line 18.

The output on line 18 through the intermediate FIFO buffer 19 is supplied on line 27 to a data output generator 28. The data output generator 28 retrieves codes across lines 29 and 30 from a compression code ROM 31 in response to the intermediate codes. In addition, the data output generator 28 concatenates the codes and other information necessary for encoding the facsimile and supplies the output on line 32 to a destination bus 33.

The destination bus 33 provides the encoded facsimile to a system for transmitting the codes to a destination location where the codes can be stored or are expanded to regenerate the facsimile.

II. Implementation of the Compression Engine

As mentioned above, the present invention is concerned with the encoding, or compression of facsimile data. Accordingly, in FIGS. 2A-2C, a detailed implementation of a compression engine for use in the apparatus 10 of FIG. 1 is provided. The compression engine shown in FIGS. 2A-2C receives pixel data across line 13 (see FIG. 2A) from the source FIFO buffer 12 as shown in FIG. 1. In addition, it receives reference line pixel data across line 26 (see FIG. 2B) from the reference input FIFO buffer 24 shown in FIG. 1. The output of the compression engine is provided on line 18 (see FIG. 2C) to the intermediate FIFO buffer 19 as shown in FIG. 1.

As mentioned in the Summary of the Invention, the encoding apparatus of the present invention comprises windowing means shown generally by reference numeral 201. The windowing means 201 comprises a first coding data input register CDIR1 202, a second coding data input register CDIR2 203 and a coding line barrel shifter CBS 204. In addition, the windowing means 201 comprises a first reference data input register RDIR1 205, a second reference data input register RDIR2 206 and a reference line barrel shifter RBS 207. The barrel shifters 204 and 207 are controlled by respective window control signals, which in this embodiment are equivalent, supplied on lines 208 and 294.

Figure 2C:
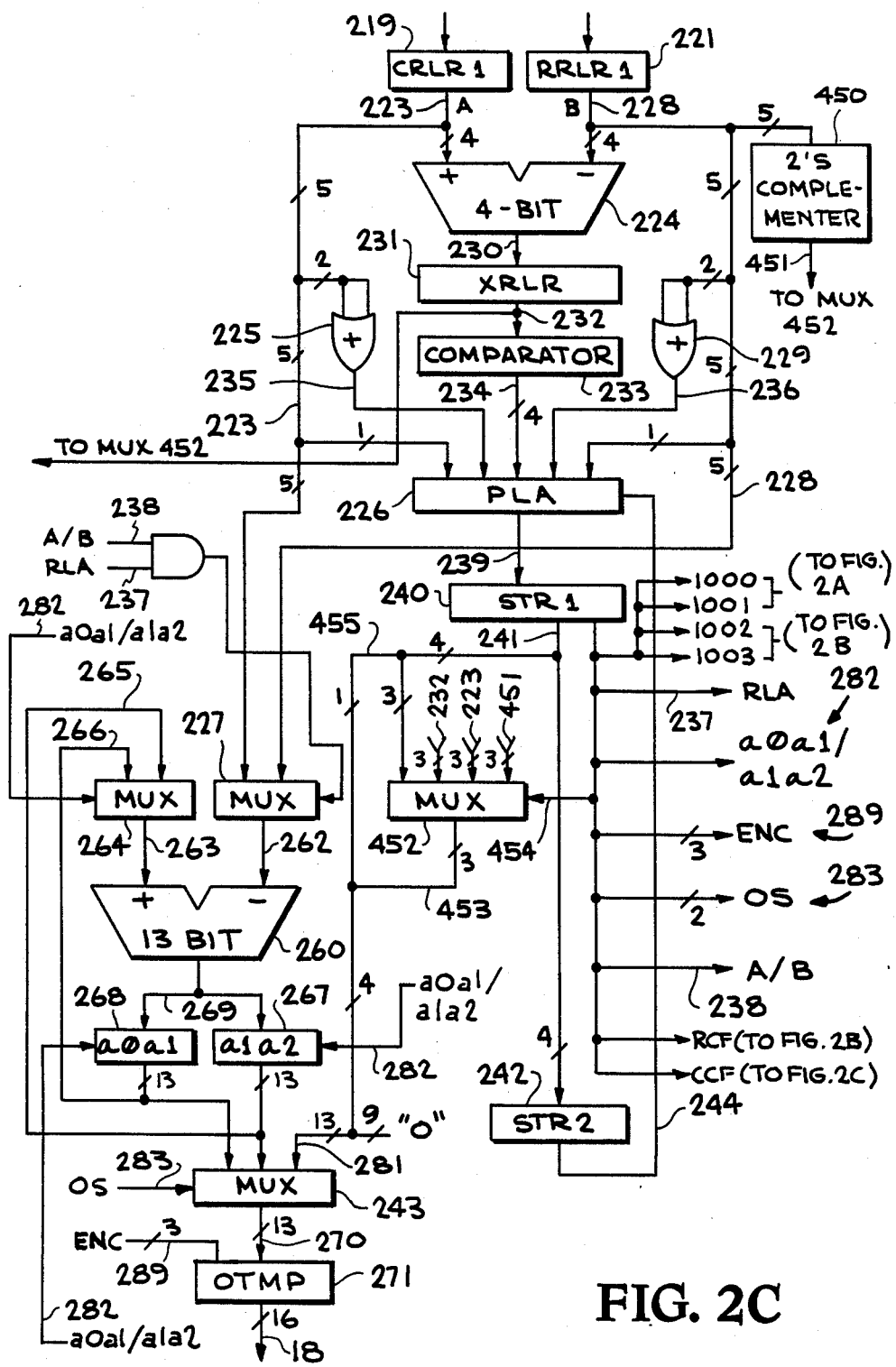

The balance of FIGS. 2A-2C makes up a means for generating intermediate codes and window control signals as mentioned in the Summary of the Invention.

As illustrated by the functional block diagram of FIGS. 2A-2C, coding line data is supplied on line 13 to the CDIR1 202. The output of the CDIR1 202 is supplied on line 209 as input to the CDIR2 203 and as one input to the CBS 204. The output of the CDIR2 203 is supplied on line 210 as the second input to the CBS 204. In the preferred embodiment, the source bus is a 16 bit bus supplying 16 bit coding data input words. Accordingly, both CDIR1 202 and CDIR2 203 are 16 bit registers. The barrel shifter CBS 204 receives 32 input bits and supplies a selected 16 bits output on line 213 under control of a coding window control signal 208 which specifies the starting bit of the selected window.

The reference line data is supplied on line 26 likewise in 16 bit words to the RDIR1 205. The output of the RDIR1 205 is supplied on line 211 as one input to the reference line barrel shifter RBS 207 and as an input to the RDIR2 206. The output of the second reference data input register RDIR2 206 is supplied on line 212 as a second input to the reference line barrel shifter RBS 207. Sixteen bit output as selected in response to a reference window control signal on line 294 from the RBS 207 is supplied on line 214. The data on lines 213 and 214 provide a window of pixel data from the coding line and the reference line for use in generating the intermediate codes according to the present invention.

The data on line 213 is supplied to a coding line unidirectional color change detector CUCCD 215. Likewise the data on line 214 is supplied to a reference line unidirectional color change detector RUCCD 216. The unidirectional color change detectors 215 and 216 are described in detail in FIGS. 3 and 4. The output of each of the unidirectional color change detectors 215 and 216 is a 5 bit code indicating the position within the window of a first desired color change element, either the first from white to black or the first from black to white depending on the respective color change flags, CCF and RCF. The CUCCD 215 supplies a signal on line 217 indicating the first desired color changing picture element in the coding line portion of the window and the RUCCD 216 supplies the 5 bit signal on line 218 identifying the first desired color changing picture element in the reference line portion of the window.

The signal on line 217 from the CUCCD 215 is supplied as an input to a multiplexer 290, the output of which is connected on line 291 to a first coding window run-length register CRLR1 219. The output of the CUCCD 215 is also supplied on line 217 to a second coding window run-length register CRLR2 220.

The output of the RUCCD 216 on line 218 is supplied to a multiplexer 292, the output of which is connected on line 293 to a first reference window run-length register RRLR1 221 and a second reference window run-length register RRLR2 222.

Multiplexers 290 and 292 are operated during the end of line routine in response to control inputs 1000, 1002, respectively, to select CBSCR1 295 or RBSCR1 299 as described below in FIG. 12. Normally, CUCCD 215 or RUCCD 216 are selected for output of the multiplexers.

The coding window control signal on line 208 is supplied from a first coding barrel shifter control register CBSCR1 295 which is loaded through multiplexer 296 in response to the window shift signal A/B on line 238. The inputs to the multiplexer 296 include a signal on line 251 from a coding temporary register CTMP 250 and a signal on line 253 from a reference temporary register RTMP 259. Likewise, the reference window control signal on line 294 is supplied from a first reference line barrel shifter control register RBSCR1 299 which is loaded through multiplexer 252 under control of the A/B signal on line 238. The inputs to the multiplexer 252 include the signal on line 251 from CTMP 250 and the signal on line 253 from RTMP 259. The output of CBSCR1 is connected as inputs across line 208 to multiplexers 290 and 298. Similarly the outputs across line 294 of RBSCR1 is connected as inputs to multiplexers 292 and 280.

The signals in CTMP 250 and RTMP 259 are generated as follows: The CRLR2 220 supplies the 5 bit code as one input to the 5 bit ALU 245 across line 246. The second input to the 5 bit ALU 245 across line 247 is a 5 bit signal from a second coding window barrel shifter control register CBSCR2 248 which is loaded through multiplexer 298, which selects its output from the CBSCR1 295 or a constant of "16" in response to control 1001 generated by the PLA 226. The output of the ALU 245 is supplied on line 249 to CTMP 250. The output of the CTMP 250 is fed back across line 251 to multiplexer 296. The second input to multiplexer 296 is supplied across line 253 from a reference window position accumulator, including ALU 255 (FIG. 2B), which receives the reference window run-length value from the RRLR2 222 across line 254. The signal on line 254 supplies one input to ALU 255. The second input to ALU 255 is supplied on line 256 from a second reference window barrel shifter control register RBSCR2 257 which is loaded through multiplexer 280 that selects its output from the RBSCR1 299 or a constant of "16" in response to control 1003 generated by the PLA 226. See FIG. 6H for a case in which the 16 is selected to cause a full 16-bit shift of the barrel shifter when no color change is detected. The output of the ALU 255 is supplied across line 258 to RTMP 259. The output of the RTMP 259 is supplied on line 253 to the multiplexers 252 and 296. The multiplexers 252 and 296 are controlled by the window shift signal A/B on line 238 to select either the signal on line 251 or the signal on line 253 as the window control signals on lines 208 and 294.

The CRLR1 219 shown in FIGS. 2A and 2C supplies its output A on line 223 as follows: the least significant 4 bits are supplied as a first input to subtractor 224; the second and third most significant bits are supplied as inputs to OR-gate 225; and the most significant bit is supplied as one input to programmable logic array 226; and all five bits are supplied as one input to multiplexer 227.

The output B of the RRLR1 221 shown in FIGS. 2B and 2C is supplied on line 228 as follows: the four least significant bits are supplied as second input to subtractor 224; the second and third most significant bits are supplied as inputs to OR-gate 229; the most significant bit is supplied as one input to the programmable logic array 226; and all five bits are supplied as a second input to multiplexer 227.

The output of the subtractor 224 is a signal, X, indicating the difference between the location of the first desired color changing element in the coding line portion of the window and the first desired color changing element in the reference line portion of the window. That signal is supplied on line 230 to the X run-length register XRLR 231. The output of the XRLR 231 is supplied on line 232 to a comparator 233. The output of the comparator includes four signals on line 234 which are supplied to the programmable logic array 226. The four signals on line 234 include the first signal that is true when the output, X, of the subtractor 224 equals 0; a second signal that is true when X is greater than 0; a third signal that is true when X equals 1; and a fourth signal that is true when X is less than 0 but greater than or equal to negative 3.

Likewise the output of OR-gates 225 and 229 are supplied on lines 235 and 236 respectively as inputs to the programmable logic array 226. The signals indicate that the first color changing element in the coding line portion of the window and reference line portion of the window respectively occur more than 3 positions to the right of the first picture element in the window.

The most significant bit of the coding window run-length signal on line 223 and reference window run-length signal on line 228 is true when no color change is detected within the coding or reference portions respectively of the window.

The programmable logic array 226 used as a state machine having the states listed in Table 1 below.

TABLE 1

| States | Information | UCCD | Codes |
|---|---|---|---|
| SA0 | a0<=BOW<a1<br>a1 = ?<br>b1 = ? | A=a1<br>B=b1 | Any code |
| SB1 | BOW = b1<br>b1<a1<br>(a1−b1)=?<br>b2<a1? | A=a1<br>B=b2 | Not V(0)<br>Not VR |
| CB1 | b1<BOW<b2<br>b1<a1<br>(a1−b1)>3<br>b2<a1? | A=a1<br>B=b2 | Not V(0)<br>Not VR<br>Not VL |
| SA1 | BOW=a1<br>a1<b1<b2<br>(b1−a1)=? | A=a2<br>B=b1 | Not P<br>Not V(0)<br>Not VR |
| CA1 | a1<=BOW<a2<br>a1<b2<br>\|a1−b1\|>3 | A=a2 | Only H |
| HA0A1 | In H Mode<br>to output a0a1 | | M(a0a1) |
| HA1A2 | In H Mode<br>to output a1a2 | | M(a1a2) |

Where:
(1) BOW = Beginning of Window
(2) A = Color Change Code from CUCCD
(3) B = Color Change Code from RUCCD
(4) a0,a1,a2,b1 and b2: CCITT defined Changing Elements

TABLE 2

| | INPUTS | | | | | | | | OUTPUTS | | | | | | |
|---|---|---|---|---|---|---|---|---|---|---|---|---|---|---|---|
| State | NA | NB | X=0 | X>0 | X=1 | 0>X ≧−3 | A>3 | B>3 | Next State | Code | Window Shift | RL Acc | EXPLANATION | a0C | CCF | RCF |
| SA0 | 0 | 0 | 1 | | | | | | SA0 | V(0) | A | No | a1=b1 | $\overline{a0C}$ | $\overline{a0C}$ | $\overline{a0C}$ |
| | 0 | 0 | | | | 1 | | | SA0 | VL(X) | A | No | b1−a1≦3 | $\overline{a0C}$ | $\overline{a0C}$ | $\overline{a0C}$ |
| | 0 | 0 | | | 1 | | | | SA0 | VR(1) | A | No | a1−b1=1 | $\overline{a0C}$ | $\overline{a0C}$ | $\overline{a0C}$ |
| | 0 | 0 | | 1 | 0 | | | | SB1 | | B | a0a1 | a1−b1>1 | a0C | a0C | $\overline{a0C}$ |
| | 0 | 0 | 0 | 0 | | 0 | | | CA1 | H | A | a0a1 | b1−a1>3 | a0C | $\overline{a0C}$ | X |
| | 0 | 1 | | | | | | | SA1 | | A | a0a1 | a1<b1 | a0C | $\overline{a0C}$ | a0C |
| | 1 | 0 | | | | | | | SB1 | | B | a0a1 | b1<a1 | a0C | a0C | $\overline{a0C}$ |
| | 1 | 1 | | | | | | | SA0 | | A | a0a1 | no a1, no b1 | a0C | a0C | a0C |
| SB1 | 0 | 0 | 1 | | | | | | SA0 | P | B | No | a1>b2 | a0C | a0C | a0C |
| | 0 | 0 | 0 | | | | 0 | | SA0 | VR(A) | A | No | a1−b1≦3, ≦b2 | $\overline{a0C}$ | $\overline{a0C}$ | $\overline{a0C}$ |
| | 0 | 0 | 0 | | | | 1 | | CA1 | H | A | a0a1 | a1−b1>3, ≦b2 | a0C | $\overline{a0C}$ | X |
| | 0 | 1 | | | | | 0 | | SA0 | VR(A) | A | No | a1−b1≦3, | $\overline{a0C}$ | $\overline{a0C}$ | $\overline{a0C}$ |

TABLE 2-continued

| State | NA | NB | X=0 | X>0 | X=1 | 0>X ≧−3 | A>3 | B>3 | Next State | Code | Window Shift | RL Acc | EXPLANATION | a0C | CCF | RCF |
|---|---|---|---|---|---|---|---|---|---|---|---|---|---|---|---|---|
|  | 0 | 1 |  |  |  |  | 1 |  | CA1 | H | A | a0a1 | <b2 a1−b1>3, | a0C | $\overline{a0C}$ | X |
|  | 1 | 0 |  |  |  |  |  |  | SA0 | P | B | No | <b2 a1>b2 | a0C | a0C | a0C |
|  | 1 | 1 |  |  |  |  |  |  | CB1 |  | A | a0a1 | a1−b1>3 | a0C | a0C | $\overline{a0C}$ |
| CB1 | 0 | 0 | 0 |  |  |  |  |  | CA1 | H | A | a0a1 | a1≦b2 | a0C | $\overline{a0C}$ | X |
|  | 0 | 0 |  | 1 |  |  |  |  | SA0 | P | B | No | a1>b2 | a0C | a0C | a0C |
|  | 0 | 1 |  |  |  |  |  |  | CA1 | H | A | a0a1 | a1<b2 | a0C | $\overline{a0C}$ | X |
|  | 1 | 0 |  |  |  |  |  |  | SA0 | P | B | No | a1>b2 | a0C | a0C | a0C |
|  | 1 | 1 |  |  |  |  |  |  | CB1 |  | A | a0a1 | no a1, no b2 | a0C | a0C | $\overline{a0C}$ |
| SA1 | 0 | 0 |  |  |  |  |  | 1 | HA0A1 | H | A | a1a2 | b1−a1>3, a2 | a0C | a0C | a0C |
|  | X | 0 |  |  |  |  |  | 0 | SA0 | VL(B) | 0 | No | b1−a1≦3 | $\overline{a0C}$ | $\overline{a0C}$ | $\overline{a0C}$ |
|  | 0 | 1 |  |  |  |  |  |  | HA0A1 | H | A | a1a2 | b1−a1>3, a2 | a0C | a0C | a0C |
|  | 1 | 0 |  |  |  |  |  | 1 | CA1 | H | A | a1a2 | b1−a1>3, Na2 | a0C | $\overline{a0C}$ | X |
|  | 1 | 0 |  |  |  |  |  |  | CA1 | H | A | a1a2 | b1−a1>3, Na2 | a0C | $\overline{a0C}$ | X |
| CA1 | 0 |  |  |  |  |  |  |  | HA1A2 | a0a1 | A | a1a2 | a2 | a0C | a0C | a0C |
|  | 1 |  |  |  |  |  |  |  | CA1 |  | A | a1a2 | No a2 | a0C | $\overline{a0C}$ | X |
| HA0A1 |  |  |  |  |  |  |  |  | HA1A2 | a0a1 | 0 | No |  | a0C | X | X |
| HA1A2 |  |  |  |  |  |  |  |  | SA0 | a1a2 | 0 | No |  | a0C | a0C | a0C |

The logic for controlling state transitions is provided in Table 2 as follows:

The outputs on line 239 of the programmable logic array 226 are supplied to a first state register STR1 240. The outputs of the STR1 240 include a four bit state code on line 241, the run-length accumulation control signal RLA on line 237, the window shift control signal A/B on line 238, the encoding bits ENC on line 289, the a0a1/a1a2 select signal on line 282, a code select signal on line 454 and the output select signal OS on line 283. The state code is supplied on line 241 to a second state register STR2 242. The output of the STR2 242 is fed back on line 244 to the programmable logic array 226.

In addition, three bits of the state code are supplied as a first input to a multiplexer 452. The fourth bit of the state code is supplied on line 455 as described below. The multiplexer 452 includes three other inputs. The first input is the value X which is supplied on line 232 from the XRLR 231. The next input is the value A which is supplied from the CRLR1 219 across line 223. Finally, the last input to the multiplexer 452 is the 2's complement of the value B which is supplied from the output of RRLR1 221 across line 228 through a complementor 450. The output of the complementor is the 2's complement of the value B and supplied on line 451.

The multiplexer 452 is controlled by the code select signal on line 454 from the PLA 226. Each of the inputs to multiplexer 452 is the 3 rightmost bits of their respective signals and the output of the multiplexer 452 is a 3 bit code which is used in the generation of the intermediate code as shown in Table 4 as set out below.

The 3 bit output of the multiplexer 452 is concatenated with the fourth bit of the state code on line 455 and then concatenated again with nine zeros to form a 13 bit code on line 281 for supply to the multiplexer 243.

The CCITT encoding standards require the accumulation of the run-lengths from a0 to a1 (a0a1) and from a1 to a2 (a1a2) in the generation of the horizontal mode code. In the compression engine of FIGS. 2A–2C, the accumulation of these values is controlled by the RLA signal supplied on line 237 and a 13 bit ALU 260. The inputs to the ALU 260 include the outputs of multiplexer 227 on line 262 and multiplexer 264 on line 263. The output of the multiplexer 227 is selected from inputs on lines 223 ad 228. The input on line 223 is the signal from the CUCCD 215. The input on line 228 is the run-length signal from RUCCD 216. When the run-length accumulation signal RLA is true, the selection between the signal on line 223 and 228 is controlled by the window shift signal A/B on line 238 to select the appropriate run length for accumulation. The output of the multiplexer 227 is supplied on line 262 as one input to the ALU 260. A second input to the ALU 260 is supplied on line 263 from multiplexer 264. Multiplexer 264 operates under control of the a0a1/a1a2 signal on line 282 to select the input on line 265 or the input on line 266 for supply to the ALU 260. Line 265 is connected to receive the output of an a1a2 accumulation register 267 and line 266 is connected to supply the output of the a0a1 accumulation register 268. The ALU 260 supplies its output on line 269 to the appropriate accumulation register 268 or 267 under control of the a0a1/a1a2 signal on line 282.

Lines 265 and 266 are also connected as second and third inputs to multiplexer 243. The output of multiplexer 243 is supplied on line 270 under control of the output select signal OS on line 283 to an output temporary register (OTMP) 271 which is connected across line 18 to the intermediate code FIFO buffer 19 shown in FIG. 1.

The OTMP 271 is a 16 bit register which receives 13 rightmost bits from the output on line 270 of multiplexer 253 and 3 leftmost bits from the encoding bits ENC generated by the PLA 226 across line 289.

III. Implementation of the Unidirectional Color Change Detectors

The implementation of the unidirectional color change detectors 215 and 216 shown in FIGS. 2A and 2B is described in detail with reference to FIGS. 3 and 4. FIG. 3 provides a block diagram of a unidirectional color change detector 300. The unidirectional color change detector 300 includes a unidirectional color transition detector 301 and encoding logic 302. The inputs to the unidirectional color transition detector 301 include a color change flag CF on line 303, a beginning of line signal BOL on line 304, a signal indicating that no color change has occurred in the coding line portion of the previous coding window NA on line 305 and a signal indicating that no color change has occurred in the reference line portion of the coding window NB on line 306 for the previous coding window. In addition, the output of the barrel shifter 204 for the coding line portion (for example) of the window I0–I15 is supplied on line 213. The output of the unidirectional color transition detector is a 16 bit code A0–A15 on line 307. The code on line 307 is supplied to encoding logic 302 which generates a 5 bit output O0–O4 on line 217 for the coding line portion of the reference window.

Figure 4:
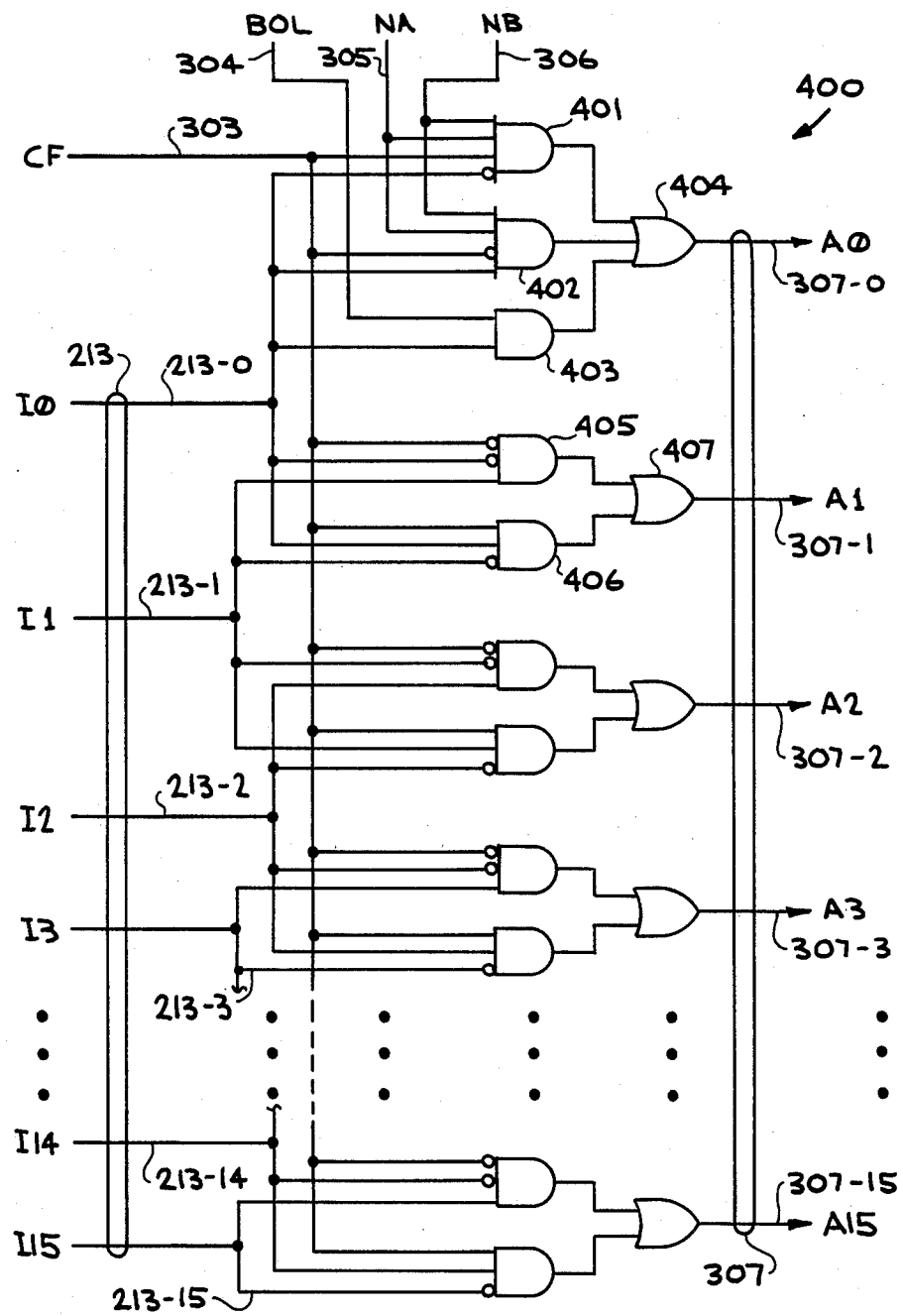
FIG. 4 is a logic diagram of the transition detector in the color change detector of FIG. 3.

The unidirectional color transition detector is a logic circuit implemented as shown in FIG. 4 such that the output An for n=1 to 15 is defined according to Equation 1 as follows:

$$An = \overline{CF} * \overline{In-1} * In + CF * In - 1 * \overline{In} \qquad \text{Eq (1)}$$

The first bit of the output A0 is defined according to Equation 2 as follows:

$$A0 = BOL * I0 + \overline{CF} * I0 * NA * NB + CF * \overline{I0} * NA * NB \qquad \text{Eq (2)}$$

The encoding logic 302 is implemented to generate the outputs O0–O4 as set forth in Table 3 below.

A1–A15. The logic circuit for the generation of A0 includes AND-gate 401, which is connected to receive the signals I0, CF, NA and NB across lines 213-0, 303, 305 and 306 respectively. In addition, the logic includes AND-gate 402 which receives as inputs the signals I0, CF, NA and NB across lines 213-0, 303, 305 and 306 respectively. Finally, AND-gate 403 is included which receives as inputs the signals BOL and I0 across lines 304 and 213-0 respectively. The input of the AND-gate 401 receiving the signal I0 includes an inverter as indicated by the small circle at the input. Likewise the input to the AND-gate 402 that receives the signal CF includes an inverter. The outputs of gates 401, 402 and 403 are supplied as inputs to OR-gate 404. The output of the OR-gate 404 supplies the signal A0 on line 307-0. Thus, it can be seen that the gates 401, 402, 403 and 404 accomplish the logic of Equation 2.

The balance of the outputs A1–A15 are generated by identical logic units. The logic unit for the generation of A1 is representative including AND-gates 405 and 406 and OR-gate 407. The inputs to AND-gate 405 include the color change flag CF, the signal I0 and the signal I1 on lines 303, 213-0 and 213-1 respectively. Likewise the inputs to AND-gate 406 include the color change flag CF, the signal I0 and the signal I1. The inputs to AND-gate 405 which receive the signal CF and signal I0 include inverters and the inputs to AND-gate 406 which receives the signal I1 includes an inverter. The output of the gates 405 and 406 are supplied as inputs to OR-gate 407. The output of OR-gate 407 provides a signal A1 on line 307-1. Thus it can be seen that the logic unit included in gates 405, 406 and 407 implements the logic of Equation 1.

In view of the foregoing description of the logic gates, the balance of FIG. 4 is self-explanatory.

IV. Implementation of the Data Output Generator

Figure 5:
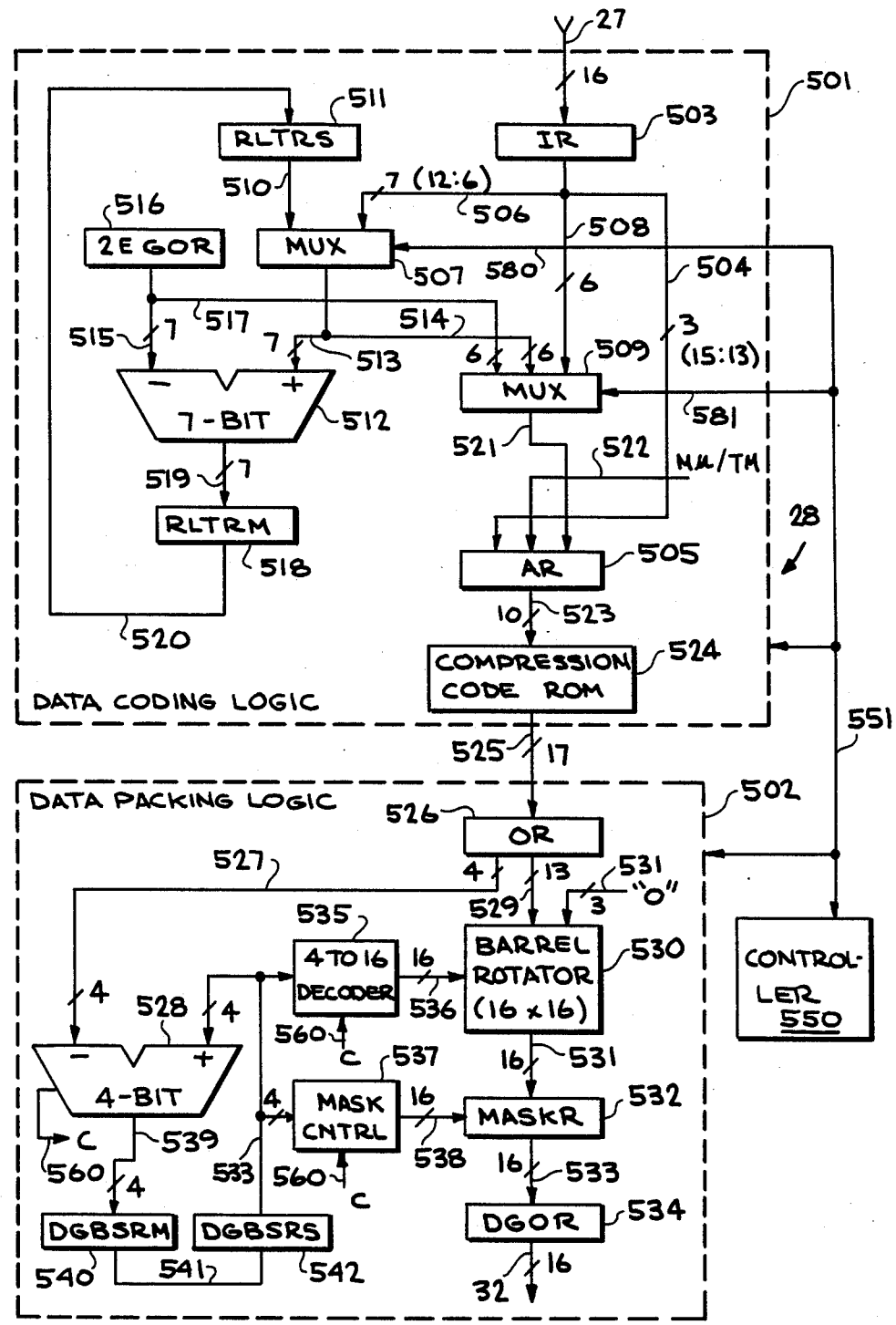
FIG. 5 is a detailed block diagram of the data output generator for the compression engine of FIG. 1.

The implementation of the data output generator 28 shown in FIG. 1 is set forth in detail in FIG. 5. As

TABLE 3

| INPUT | | | | | | | | | | | | | | | | OUTPUT | | | | |
|---|---|---|---|---|---|---|---|---|---|---|---|---|---|---|---|---|---|---|---|---|
| A0 | A1 | A2 | A3 | A4 | A5 | A6 | A7 | A8 | A9 | A10 | A11 | A12 | A13 | A14 | A15 | O4 | O3 | O2 | O1 | O0 |
| 1 | X | X | X | X | X | X | X | X | X | X | X | X | X | X | X | 0 | 0 | 0 | 0 | 0 |
| 0 | 1 | X | X | X | X | X | X | X | X | X | X | X | X | X | X | 0 | 0 | 0 | 0 | 1 |
| 0 | 0 | 1 | X | X | | | | | | | | | | | | 0 | 0 | 0 | 1 | 0 |
| 0 | 0 | 0 | 1 | X | | | | | | | | | | | | 0 | 0 | 0 | 1 | 1 |
| 0 | 0 | 0 | 0 | 1 | X | X | | | | | | | | | | 0 | 0 | 1 | 0 | 0 |
| 0 | 0 | 0 | 0 | 0 | 1 | X | X | | | | | | | | | 0 | 0 | 1 | 0 | 1 |
| 0 | 0 | 0 | 0 | 0 | 0 | 1 | X | X | | | | | | | | 0 | 0 | 1 | 1 | 0 |
| 0 | 0 | 0 | 0 | 0 | 0 | 0 | 1 | X | | | | | | | | 0 | 0 | 1 | 1 | 1 |
| 0 | 0 | 0 | 0 | 0 | 0 | 0 | 0 | 1 | X | X | | | | | | 0 | 1 | 0 | 0 | 0 |
| 0 | 0 | 0 | 0 | 0 | 0 | 0 | 0 | 0 | 1 | X | X | | | | | 0 | 1 | 0 | 0 | 1 |
| 0 | 0 | 0 | 0 | 0 | 0 | 0 | 0 | 0 | 0 | 1 | X | X | | | | 0 | 1 | 0 | 1 | 0 |
| 0 | 0 | 0 | 0 | 0 | 0 | 0 | 0 | 0 | 0 | 1 | X | X | | | | 0 | 1 | 0 | 1 | 1 |
| 0 | 0 | 0 | 0 | 0 | 0 | 0 | 0 | 0 | 0 | 0 | 1 | X | X | | | 0 | 1 | 1 | 0 | 0 |
| 0 | 0 | 0 | 0 | 0 | 0 | 0 | 0 | 0 | 0 | 0 | 0 | 1 | X | X | | 0 | 1 | 1 | 0 | 1 |
| 0 | 0 | 0 | 0 | 0 | 0 | 0 | 0 | 0 | 0 | 0 | 0 | 1 | X | | | 0 | 1 | 1 | 1 | 0 |
| 0 | 0 | 0 | 0 | 0 | 0 | 0 | 0 | 0 | 0 | 0 | 0 | 0 | 1 | | | 0 | 1 | 1 | 1 | 1 |
| 0 | 0 | 0 | 0 | 0 | 0 | 0 | 0 | 0 | 0 | 0 | 0 | 0 | 0 | 0 | 0 | 1 | 0 | 0 | 0 | 0 |

FIG. 4 illustrates a logic implementation of the unidirectional color transition detector 400 corresponding to the unidirectional color transition detector 301 of FIG. 3. The inputs include the BOL signal on line 304, the NA signal on line 305, the NB signal on line 306 and the color change flag on line 303. In addition, the input signals I0–I15 on lines are provided. The outputs from the logic circuit include A0–A15 on line 307.

As indicated above, the logic for the generation of A0 is different from the logic for each of the other outputs mentioned above, the data output generator receives data across line 27 from the intermediate FIFO buffer 19. The data in the intermediate FIFO buffer 19 includes 16 bit data words generated at the output of the compression/expansion engine 14 through the output temporary register 271 shown in FIG. 2C.

The 16 bits supplied across line 27 to the input register 503 include at the 3 leftmost positions, bits 15 through 13, the ENC signal including an end-of-line code, a code indicating whether one-dimensional or two-dimensional coding is occurring and a color indicator. In the 13 rightmost positions, a run-length data is supplied from the run-length accumulation circuitry shown in FIG. 2C or the intermediate codes are provided in bit position 3 through 0 concatenated with 9 zeros in bit positions 12 through 4. The intermediate codes are set forth in the following Table 4. Of course, the intermediate codes can be selected to suit a particular implementation.

TABLE 4

| INT'L CODE | INTERM. CODE (3:0) |     |     |     |
|------------|---|---|---|---|
| V(0)       | 0 | 0 | 0 | 0 |
| VR(1)      | 0 | 0 | 0 | 1 |
| VR(2)      | 0 | 0 | 1 | 0 |
| VR(3)      | 0 | 0 | 1 | 1 |
| VL(1)      | 0 | 1 | 1 | 1 |
| VL(2)      | 0 | 1 | 1 | 0 |
| VL(3)      | 0 | 1 | 0 | 1 |
| P          | 1 | 0 | X | X |
| H          | 1 | 1 | X | X |

Bits 12–4 are used only when encoding run-lengths such as during a horizontal mode or 1D coding. For encoding run-lengths, the international standard provides a "make-up" code and a "termination" code. Make-up codes are special codes having a maximum value of 2560 in the embodiment described.

The length of the run-length data is 13 bits in the preferred embodiment for supporting an 8K pixels per line facsimile. The length of the run-length code can increase for facsimiles having more than 8K pixels per line.

FIG. 5 illustrates the 16 bit data words coming in on line 27. The output of the data output generator 28 is supplied on line 32 in the form of 16 bit words coded according to the international CCITT standard.

The data output generator 28 shown in FIG. 5 includes data coding logic 501 and data packing logic 502. The data coding logic 501 receives the input on line 27 at input register 503, and supplies the input data words having bits 15–0 as follows:

(1) bits 15–13 supplied on line 504 as leftmost inputs to address register 505;

(2) bits 12–6 supplied on line 506 as a first input to multiplexer 507; and (3) bits 5–0 supplied on line 508 as a first input to multiplexer 509.

Multiplexer 507 receives as a second input the output of a run-length temporary register 511 across line 510. The output of the multiplexer 507 supplies, in response to control on line 580, 7 bits as a positive input to subtractor 512 across line 513 and 6 bits across line 514 as a second input to multiplexer 509. The negative input to subtractor 512 is supplied on line 515 from a constant register 516 holding a constant (0 1 0 1 0 0 0) equivalent to the 7 leftmost bits out of 13 of binary 2560. The 6 rightmost bits of the constant register 516 are supplied on line 517 as a third input to multiplexer 509. The output of subtractor 512 is supplied to a first run-length temporary register 518 across line 519. The output of the temporary register 518 is supplied on line 520 to a second run-length temporary register 511. This circuitry involving the subtractor 512 is utilized in the generation of run-length codes used in the horizontal mode for 2D coding and during 1D coding.

The output of the multiplexer 509, in response to control on line 581, is supplied on line 521 as the rightmost bits to the address register 505. As mentioned above, the 3 leftmost bits are supplied across line 504 from the input register 503. The fourth bit position from the left is loaded with a signal indicating either a make-up or a termination code on line 522 for run-length and horizontal mode coding. The output of the address register 505 is a 10 bit address supplied on line 523 to the compression code ROM 524 (designated 31 in FIG. 1).

The data in the input register 503 may include run-length data for horizontal mode or one-dimensional coding. If so, the 7 more significant bits of the run-length data are supplied through multiplexer 507 to subtractor 512. Those 7 more significant bits are used to subtract 2560 from the value in the input register 503.

If the result is positive or zero, the 6 rightmost bits from the constant register 516 are supplied through multiplexer 509 as the 6 rightmost bits of the address register for encoding a 2560 make-up code.

In addition, when the results are positive, the result of the subtraction is loaded from the run-length temporary register master RLTRM 518 to the run-length temporary register slave RLTRS 511. Then the 6 least significant bits of the RLTRS 511 are supplied through multiplexer 507 as an input to subtractor 512 where it is again subtracted by 2560 and the process is repeated until a negative result is achieved. If the result is negative, the 6 least significant bits of RLTRS 511 are supplied on line 514 through multiplexer 509 as the rightmost bits of the address register AR 505 for encoding a final make-up code. After the final make-up code, the 6 rightmost bits 5:0 of the input register 503 are supplied through multiplexer 509 as the 6 rightmost bits of the address register AR 505 for use in encoding the termination code according to the international standard.

For example, if the input register 503 contains:

0 0 1 0 1 1 0 1 0 1 0 1 0 0 1 0, and the leftmost bit indicates that it is not the end of a line, the next bit indicates that one-dimensional coding is to be accomplished and the third bit indicates the color black. Bits 6 through 12 will result in the generation of a make-up code of "2560" (0 1 0 1 0 0 0) and a second make-up code of "832" (0 0 0 0 1 0 1). The 6 rightmost bits will result in the generation of a termination code of "18" (0 1 0 0 1 0).

The make-up and termination code signal on line 522 is generated by the controller 550 in response to results of the subtraction in the subtractor 512.

If the data in the input register 503 includes an intermediate code, it is selected immediately through multiplexer 509 to the address register 505 for accessing the compression code ROM 524 to generate the international code.

The compression code ROM 524 is a standard read-only memory in the preferred embodiment adapted to provide the CCITT standard code in response to the intermediate code set forth above in Table 4 and the run-length values for the horizontal mode codes and one-dimensional coding.

The output of the compression code ROM 524 is supplied on line 525 to the data packing logic 502. The data packing logic receives the output of the compression code ROM 524 in an output register 526. The format of the data received from the compression code ROM is a 17 bit code in which the 4 leftmost bits are a code indicating the length of the CCITT standard code supplied in the rightmost portion of the word. The rightmost 13 bits include the standard CCITT code left-justified with zeros in any remaining positions to the right.

The 4 leftmost bits in the output register are supplied on line 527 as a first input to adder 528. The 13 rightmost bits are supplied on line 529 as the 13 leftmost inputs to barrel rotator 530. The 3 rightmost inputs to barrel rotator 530 include 3 zeros on line 531.

The output of the barrel rotator 530 is supplied on line 531 to a masking register 532. The output of the masking register is supplied on line 533 to an output register 534. The output of the output register 534 is supplied on line 32 to the destination bus 33 shown in FIG. 1.

Control of the barrel rotator 530 is provided by the 4 to 16 decoder 535 across line 536.

Control of the masking register 532 is supplied by the mask control circuitry 537 across line 538.

The output of the adder 528 is supplied on line 539 to a data output generator barrel shift register master 540 and from there across line 541 to a data output generator barrel shift register slave 542. The output of the data output generator barrel shift register slave 542 is a 4 bit code supplied across line 533 as inputs to the 4 to 16 decoder 535 and the mask controller 537.

In addition, a controller 550 implemented as a state machine in the preferred embodiment controls the operation of the data output generator across bus 551 which indicate generally the connection of the state machine controller 550 to the operative components shown in FIG. 5. The control signals on lines 580 and 581 for multiplexers 507 and 509, respectively, are likewise provided across bus 551 from the controller 550.

In order to control the barrel rotator 530, for a first code in a sequence, the data output generator barrel shift register slave 542 contains the value of 0. The code length of the first code is supplied across line 527 to the adder 528, where it is added to the value of zero from the slave register 542. Thus, the output of the adder 528 is supplied to the data output generator barrel shifter master 540 with the value of the first code length. The data output generator barrel shift register slave supplies a zero to the 4–16 decoder 535 so that the input to the barrel rotator is not shifted. This results in the first code being left-justified at bit position 15. For instance, if the first code to be supplied is V(0), its international code is "1" and its code length is 1. This results in the code "1" being loaded into bit position 15 with bit positions 14 through 3 containing don't care values and positions 2 through 0 containing 0 as follows:

1 X X X X X X X X X X X X 0 0 0.

The mask controller 537 also receives a value of 0 from the data output generator barrel shift register slave 542 resulting in a mask which allows each bit at the output of the barrel rotator 530 to be staged to a holding register in the mask register 532.

Assume the second code is a VR(1) standard code so that the code word is "0 1 1" having a code length of 3. For the next code, the data output generator slave register 542 will contain a value of 1 corresponding to the code length of the preceding code. That value is added in adder 528 to the code length of the next code, 3, so that the data output generator barrel shift register master 540 will store value 4.

The 4–16 decoder 535 will receive the input from the data output generator barrel shift register slave 542 and supply a value of 1 to the barrel rotator 530. This results in a left-justified code "0 1 1" to be shifted to the right by 1 bit position resulting in the following code word to be stored in the barrel rotator:

0 0 1 1 X X X X X X X X X X 0 0.

The mask control 537 will also receive the value of 1 causing the mask register to mask the first bit only from the output of the barrel rotator 530 in such a way that the first bit in the mask holding register remains unchanged and the following 15 bits will receive the output of the barrel rotator, thereby concatenating the first code of "1" with the second code of "0 1 1" in the 4 leftmost bit positions in the mask holding register of the masking register 532.

Assume the following code is an end-of-line code, EOL, which according to the international standard is encoded as "0 0 0 0 0 0 0 0 0 0 1 1" having a code length of 13. For this following code the contents of the data output generator barrel shift register slave 542 will be 4. The code length 13 of the end-of-line code is added with 4 resulting in an output of 1 to the data output generator barrel shift register master and the generation of a carry signal on line 560. The 4–16 decoder receives a value of 4 causing the barrel rotator 530 to shift 4 positions resulting in the third code word at the output of barrel rotator 530 as follows:

1 0 0 0 0 0 0 0 0 0 0 0 0 0 0 1.

The mask controller 537 likewise receives 4 from the data output generator barrel shift register slave 542 causing the mask register 532 to receive all but the 4 leftmost bits of the third code. This results in latching in the holding register of the mask register 532 of the following code:

1 0 1 1 0 0 0 0 0 0 0 0 0 0 0 1.

This is a 16 bit code in the holding register of the mask register 532 which in response to the carry signal is staged to the data output generator output register 534 and supplied on line 32 to the destination bus.

At this point the data output generator barrel shift register slave 542 contains a value of 1. However, the rotation of the code had already occurred in the previous iteration. The carry signal 560 is supplied to the 4–16 decoder to prevent any shifting causing output of 0 on line 536 to the barrel rotator 530. This results in the following code being loaded to the barrel rotator output containing end-of-line code:

1 0 0 0 0 0 0 0 0 0 0 0 0 0 0 1.

The mask controller is also overridden by the carry signal on line 560 to pass all bits to the mask holding register in the mask register 532, therefore saving the bits left over from the previous code word for concatenation with following code words. After latching the leftover bits of the mask holding register, the following code is received at the output register from the data coding logic 501. The data output generator barrel shift register slave 542 contains the value of 1 which can be used to control the loading of the following code, thereby saving the remainder of the previous code, which in this example is a single bit.

In the present invention it can be seen that, based on the generation of intermediate codes, 16 bit code words encoding a facsimile according to the CCITT standard are generated in a high performance windowing state machine architecture. The operation of the state machine controlling the data compression engine is described below.

V. Operation of the State Machine

As mentioned above, the state machine operates to generate intermediate codes for use in encoding the facsimile data according to the international standard codes. The state machine receives input data concerning the location of the first color changing element in the reference line portion and coding line portion of the coding window. During a state transition, intermediate code is generated and a window control signal is generated. FIGS. 6A-10B show examples of coding windows upon which an explanation of the generation of the intermediate code and the window control signal is based. FIGS. 11A-11C and 12 are flow charts illustrating the operation of the compression engine of FIGS. 2A-2C in the generation of the standard codes.

Figure 6A:
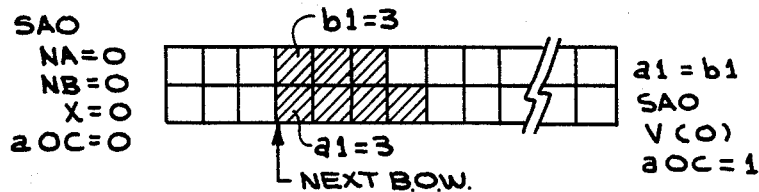
FIGS. 6A through 6H are diagrams of windows of pixel data used in explaining the operation of the state machine (PLA) shown in FIG. 2C with reference to Table 2 in the specification.

FIGS. 6A-6H are examples of coding windows that correspond to the 8 transition possibilities from the state SA0 shown in Table 2. FIG. 6A illustrates the coding window for SA0 in which NA=0, NB=0, X=0 and a0C=0. As can be seen, the b1 is positioned at picture element 3. Likewise the element a1 is positioned at picture element 3, so that a1=b1. In this condition, a V(0) international code should be generated and the next state will be still SA0. The window control signal will cause the next beginning of window (BOW) to be positioned at picture element 3. This is accomplished by causing the multiplexers 296 and 252 to select the signal on line 251 as the window control signal so that the picture element a1 is aligned with the beginning of the window. The color of the changing element a0 will be toggled in this case.

Figure 6B:
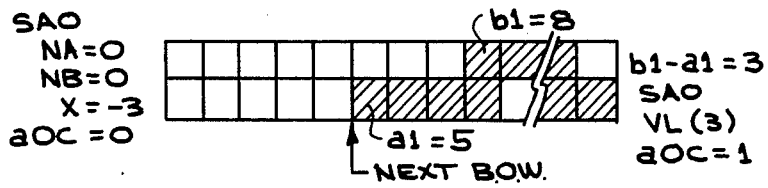

FIG. 6B illustrates the condition in state SA0 in which NA=0, NB=0, a0C=0 and X=−3. In the example of FIG. 6B, a1 occurs at picture element 5, b1 occurs at picture element 8 so that b1−a1=3. This indicates that a VL(3) international code should be generated and the state machine should transition to state SA0. The next beginning of window should align with the element a1 at picture element 5. This next beginning of window is accomplished by assertion of the A/B signal to select the signal on line 251. The color of the changing element a0 will be toggled in this case.

Figure 6C:
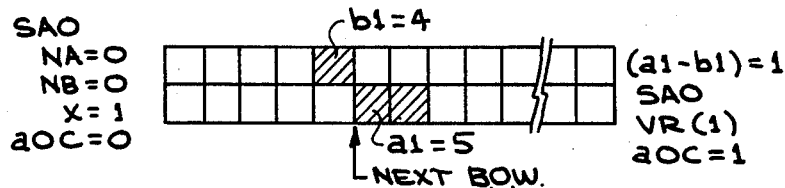

FIG. 6C illustrates a window in state SA0 in which NA=0, NB=0, a0C=0 and X=1. As can be seen in the example, a1 is at picture element 5, b1 is at picture element 4, so that a1−b1=1. This indicates that the international code VR(1) should be generated and the next state is SA0. The next beginning of window is selected to align with picture element a1. The color of changing element a0 will be toggled.

Figure 6D:
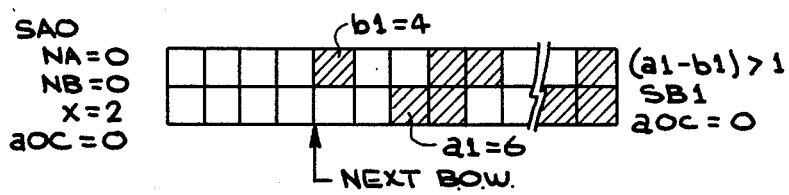
Figure 6E:
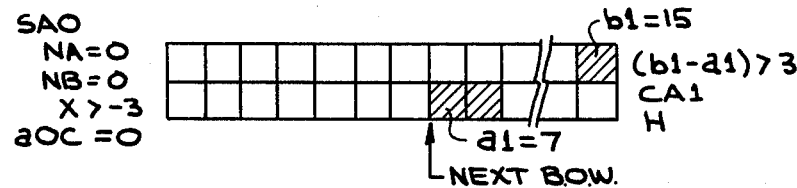
Figure 6F:
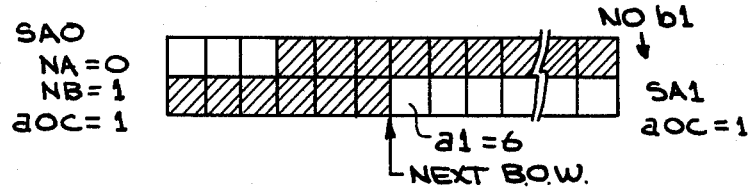

FIG. 6D shows a window state SA0 in which NA=0, NB=0, a0C=0 and X=2. In the example, a1 is at picture element 6, b1 is at picture element 4, so that a1−b1 is greater than 1. In this condition, the next state is SB1 and the next beginning of window aligns with the element b1. This alignment with element b1 is accomplished by causing the multiplexers 296 and 252 to select the signal on line 253 as a window control signal. The color of a0 remains the same FIG. 6E illustrates a window in state SA0 in which NA=0, NB=0 and X is greater than −3. As can be seen, the example a1=7 and b1=15. Thus, b1−a1 is greater than 3. In this condition, the next state is CA1 and the international code to be generated is the horizontal mode code H. The next beginning of window is controlled to align with the element a1. The color of a0 remains the same FIG. 6F shows a window in state SA0 in which NA=0 and NB=1 and a0C=1. In the example, a1 is at picture element 6 and there is no b1. The next state is SA1 and the next beginning of window is caused to align with a1 and a0C is unchanged.

Figure 6G:
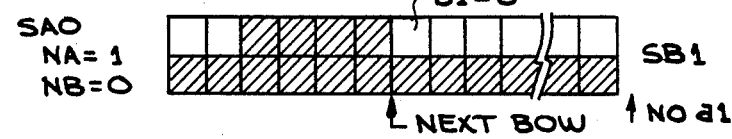

FIG. 6G illustrates a window in state SA0 in which NA=1 and NB=0. In the example, b1 occurs at picture element 6 and there is no a1. The next state is SB1 and the next beginning of window is caused to align with the element b1.

Figure 6H:
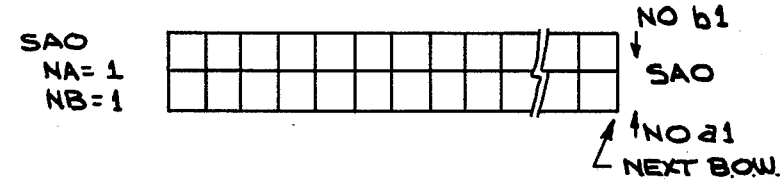

FIG. 6H shows a window in the state SA0 in which NA=1 and NB=1. In the example, there is no a1 and no b1. In this case, the next state is SA0 and the next beginning of window is caused to align with the picture element following the end of the window. This occurs because the value output by the unidirectional color change detectors 215 and 216 is 16 when there is no color change detected. This causes 16 to be supplied on line 251 when there is no a1 detected. Selection in the multiplexers 296 and 252 of the signal on line 251 results in a 16 bit shift in the barrel shifter 204 and 205.

Figure 7A:
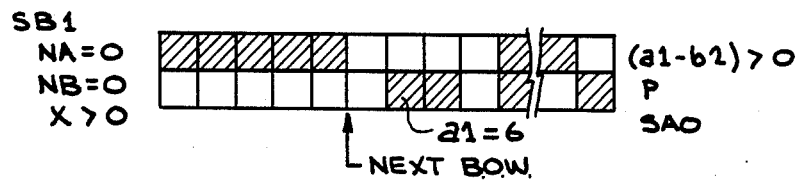
FIGS. 7A through 7G are diagrams of windows of pixel data used in explaining the operation of the state machine (PLA) shown in FIG. 2C with reference to Table 2 in the specification.

FIG. 7A-7G illustrate examples of state transitions from the state SB1 as shown in Table 2. In FIG. 7A, the coding window from state SB1 when NA=0 and NB=0 for X is greater than 0 is shown. The example shown, b1, is at picture element 0, b2 is at picture element 5 and a1 is at picture element 6. In this case, a1−b2 is greater than 0. The international code is a pass mode signal P and the next state is SA0. The next beginning of window is forced to align with the picture element b2.

Figure 7B:
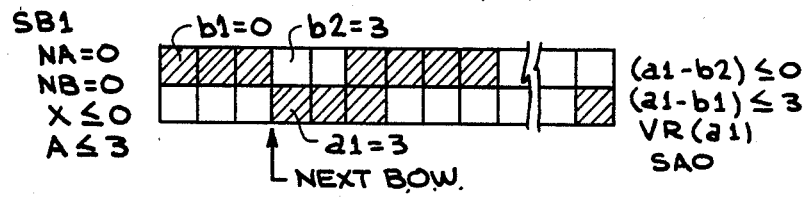

FIG. 7B shows a coding window in state SB1 in which NA=0, NB=0, X is less or equal to 0, and a1 occurs at a picture element greater than or equal to 3. As shown in the figure, b1 is at picture element 0, b2 is at picture element 3 and a1 is at picture element 3. Thus, a1−b2 is less or equal to 0 and a1−b1 is less than or equal to 3. In this case, the code to be generated is the vertical mode code VR(a1) and the next state is SA0. The next beginning of window is caused to align with the picture element a1.

Figure 7C:
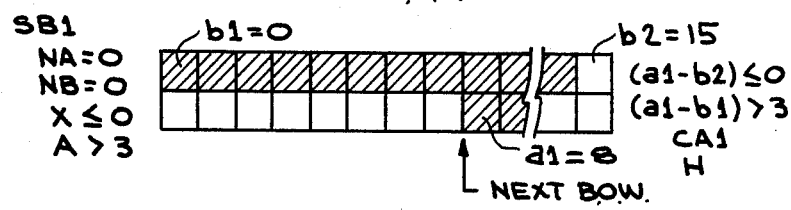

FIG. 7C shows a coding window in state SB1 in which NA=0, NB=0, X is less than or equal to 0 and the position of a1 is greater than 3. As can be seen in the example, b1 is at element 0, and b2 is at element 15. The element a1 occurs at picture element 8. Thus, a1−b2 is less than or equal to 0, a1−b1 is greater than 3. The next state is CA1 and the international code to be generated is horizontal mode code H. The next beginning of window is set to align with a1.

Figure 7D:
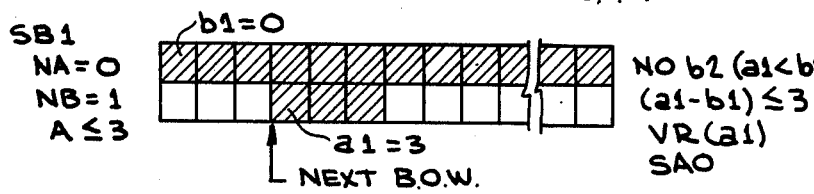

FIG. 7D shows a coding window in state SB1 when NA=0 and NB=1 and the element a1 is at picture element 3. In the example, b1 is at element 0, b2 is at element 16 or beyond, and a1 is at element 3. There is no b2, so a1 is less than b2; and a1−b1 is less than or equal to 3. The international code to be generated is VR(3) and the next state is SA0. The next beginning of window is caused to align with a1, picture element 3.

Figure 7E:
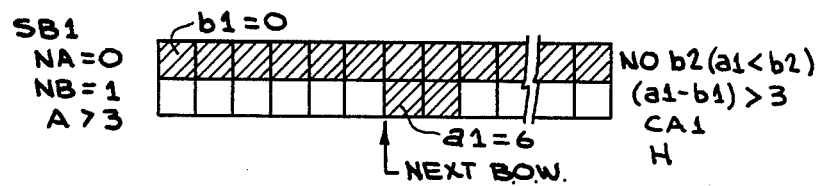

FIG. 7E shows a coding window in state SB1 in which NA=0, NB=1 and picture element a1 is at element greater than 3. In the example, b1 is at element 0, and there is no b2. a1 occurs at picture element 6. Since there is no b2, a1 is less than b2. a1−b1 is greater than 3. Thus, the next state is CA1 and the code to be generated is horizontal mode H. The next beginning of window is set at a1.

Figure 7F:
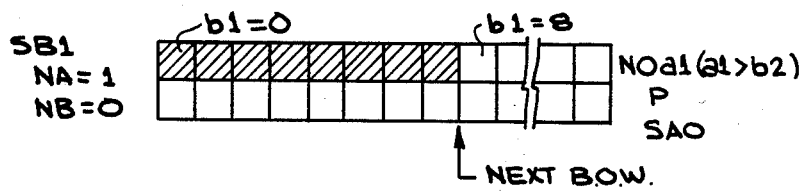

FIG. 7F shows a coding window in state SB1 when NA=1 and NB=0. In the example, b1 is at element 0, b2 is at element 8 and there is no a1. Because there is no a1, a1 is greater than b2. Thus, the international code generated is the pass mode code P and the next state is SA0. The next beginning of window is caused to align with picture element b2.

Figure 7G:
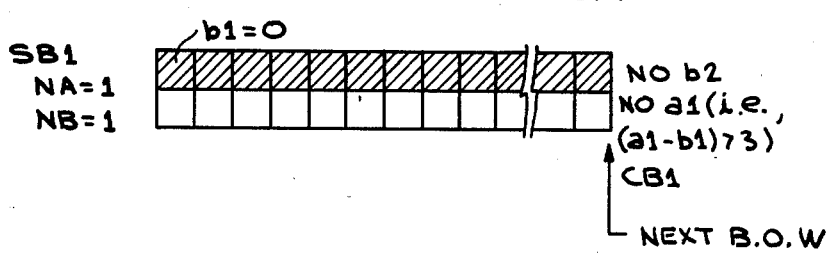

FIG. 7G shows a coding window in state SB1 in which NA=1 and NB=1. In the example, b1 is at element 0 and there is no b2. Further there is no a1. Since there is no b2 and no a1 (i.e., (a1−b1)>2), the next state is the CB1 state. The international code to be generated is indeterminate. The next beginning of window is set to align with the picture element following the end of the window in the manner described with reference to FIG. 6H.

Figure 8A:
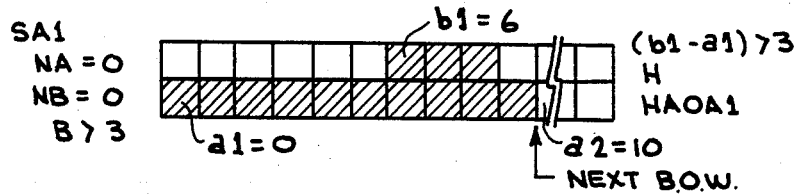
FIGS. 8A through 8E are diagrams of windows of pixel data used in explaining the operation of the state machine (PLA) shown in FIG. 2C with reference to Table 2 in the specification.

FIGS. 8A–8E illustrate coding windows from state SA1 in various state transitions as shown in Table 2. FIG. 8A shows a coding window in state SA1 in which NA=0, NB=0 and b1 is greater than 3. In the example, b1 is at picture element 6 and a2 is at picture element 10. Thus, b1−a1 is greater than 3. The international code to be generated is a horizontal mode code H and the next state is HA0A1. The next beginning of window is caused to align with the element a2.

Figure 8B:
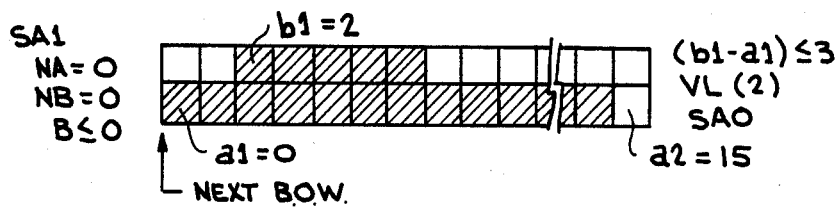

FIG. 8B shows a coding window in state SA1 in which NA=0, NB=0 and B is less than or equal to 3. In the example, b1 is set in picture element 2, a1 is at picture element 0 and a2 is in picture element 15. In this case b1−a1 is less than or equal to 3, the code to be generated is vertical code VL(2) and the next state is SA0. The next beginning of window is set to align with picture element a1, so there is no shift.

Figure 8C:
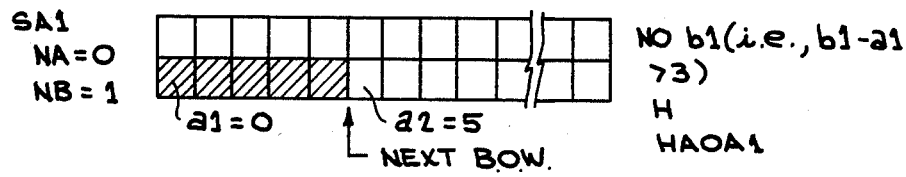

FIG. 8C shows a coding window in state SA1 in which NA=0 and NB=1. In the example, a1 is at picture element 0 and a2 is at picture element 5. Because there is no b1, b1−a1 is greater than 3. The international code to be generated is the horizontal mode code H and the next state is HA0A1. The next beginning window is set to align with the element a2.

Figure 8D:
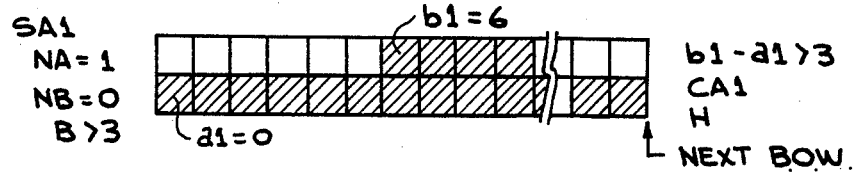

FIG. 8D shows a coding window in state SA1 in which NA=1, NB=0 and b1 is greater than 3. In the example, b1 is in picture element 6, a1 is at element 0 and there is no a2. Thus, b1−a1 is greater than 3. The next state is CA1 and the international code is the horizontal mode code H. The next beginning of window is set to align with the element a2 at the end of the window in the manner described with reference to FIG. 6H.

Figure 8E:
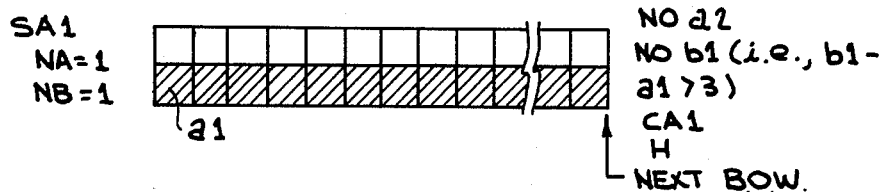

FIG. 8E shows a coding window in state SA1 in which NA=1 and NB=1. In the example, there is no b1, a1 is at element 0 and there is no a2. In this instance, b1−a1 is greater than 3 so the next state is CA1 and the code to be generated is H. The next beginning of window is set at the end of the window in the manner described with reference to FIG. 6H.

Figure 9A:
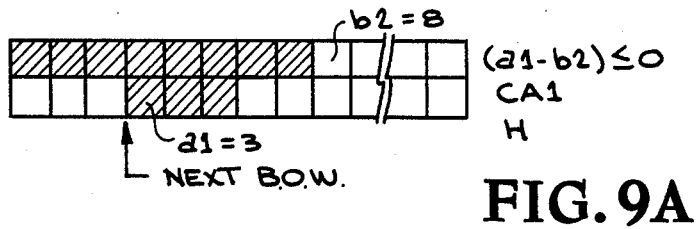
FIGS. 9A through 9E are diagrams of windows of pixel data used in explaining the operation of the state machine (PLA) shown in FIG. 2C with reference to Table 2 in the specification.

FIGS. 9A–9E illustrate coding windows in state CB1 for describing a state transition as shown in Table 2. FIG. 9A shows a window in state CB1 in which NA=0, NB=0 and X is less than or equal to 0. In the example, b2 is at element 8 and a1 is at element 3. Thus a1−b2 is less than or equal to 0. The next state is CA1 and the international code to be generated is the horizontal mode code H. The next beginning of window is set to align with the picture element a1.

Figure 9B:
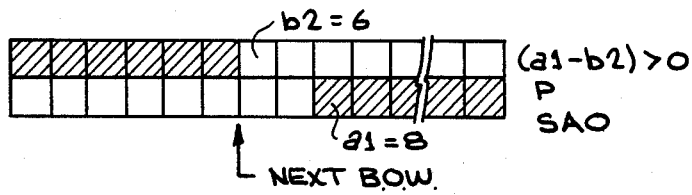

FIG. 9B shows a coding window in state CB1 in which NA=0, NB=0 and X is greater than 0. In the example, a1 is at picture element 8, and b2 is at picture element 6. Thus, a1−b2 is greater than 0, the mode identified is the pass mode P, and the next state is SA0. The next beginning of window is set to align with picture element b2.

Figure 9C:
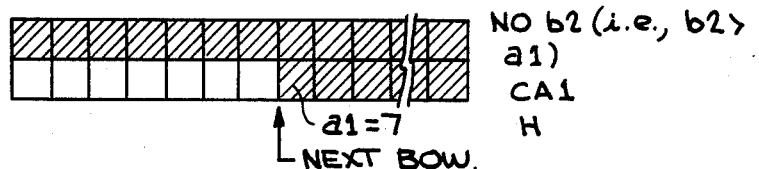

FIG. 9C shows a coding window in state CB1 in which NA=0 and NB=1. In the example, there is no b2, and a1=7. Because there is no b2, b2 is greater than a1. Therefore the next state is CA1 and the code identified is the horizontal mode code H. The next beginning of window is set to begin with the picture element a1.

Figure 9D:
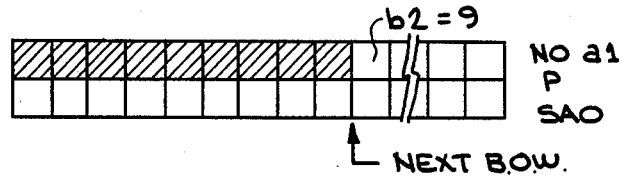

FIG. 9D shows a coding window in state CB1 in which NA=1 and NB=0. In the example b2 is at element 9 and there is no a1. In this instance, the mode identified is the pass mode P and the next state is SA0. The next beginning of window is set to align with picture element b2.

Figure 9E:
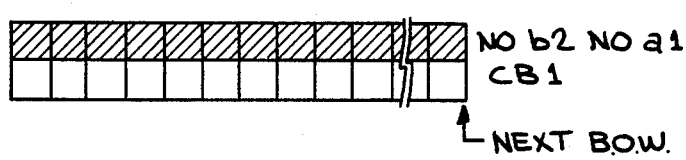

FIG. 9E shows a coding window in state CB1 in which NA=1 and NB=1. In the example, there is no b2 and no a1. In this case the next state is CB1 and the code is indeterminate.

Figure 10A:
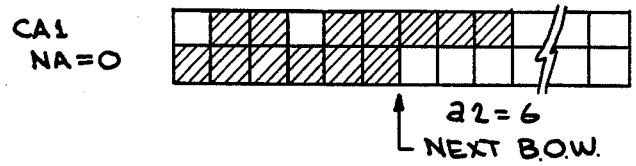
FIGS. 10A and 10B are diagrams of windows of pixel data used in explaining the operation of the state machine (PLA) shown in FIG. 2C with reference to Table 2 in the specification.
Figure 10B:
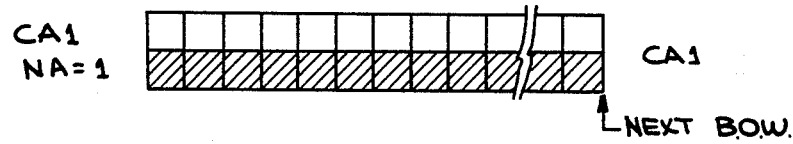

FIGS. 10A and 10B show coding windows in state CA1 for illustration of the state transitions of Table 2. FIG. 10A shows a coding window in state CA1 in which NA=0. In the example, a2 appears at element 6. Because a2 is found, the code identified is run-length code a0a1 and the next state is HA1A2. The next beginning of window is set to align with the element a2.

FIG. 10B illustrates a coding window in state CA1 in which NA=1. In the example, there is no a2. In this case, the next state is CA1 and the international code is indeterminate. The next beginning of window is set to align with the element immediately following the window in the manner described with reference to FIG. 6H.

Thus it can be seen that during state transitions, the international codes to be generated can be identified by a code indicating which state transition has occurred.

Figure 11A:
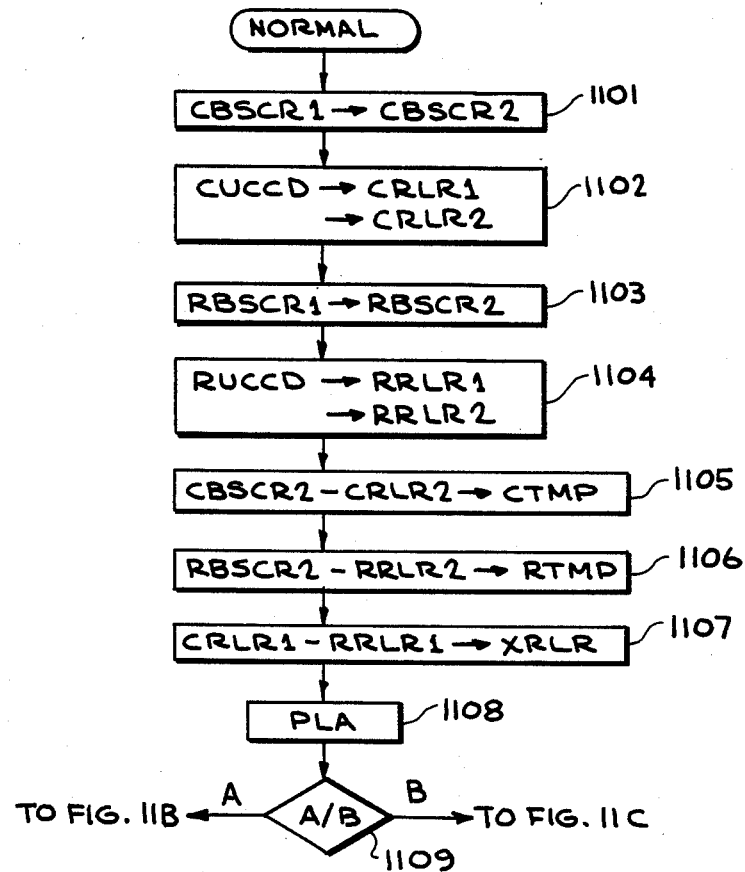
FIGS. 11A, 11B and 11C are flow charts illustrating normal operation of the compression engine of the present invention.
Figure 11C:
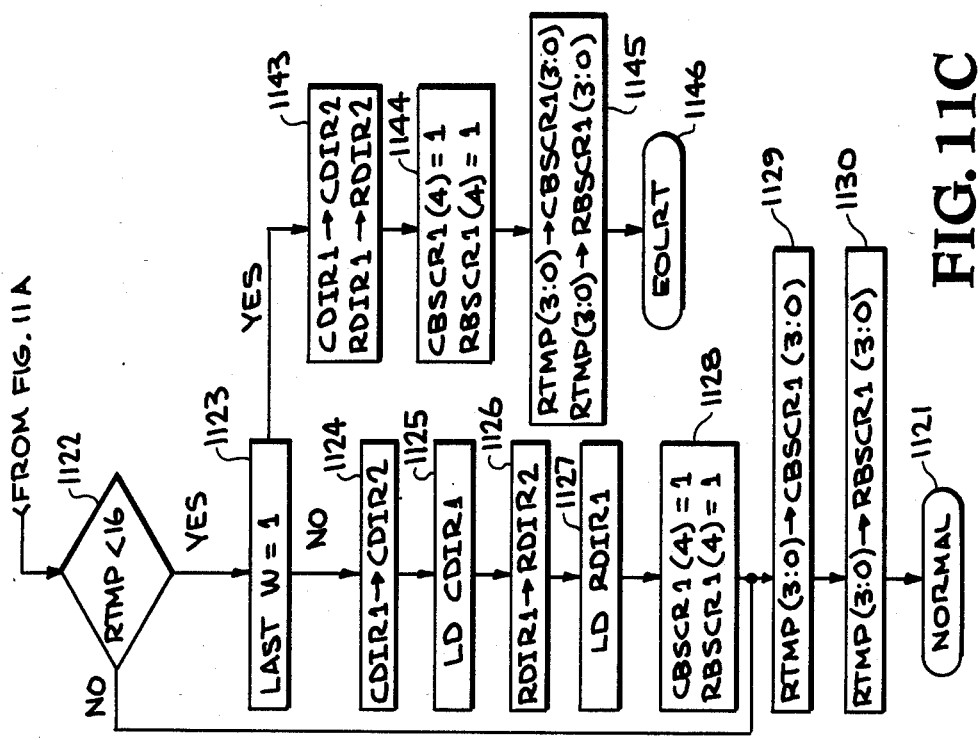
Figure 11B:
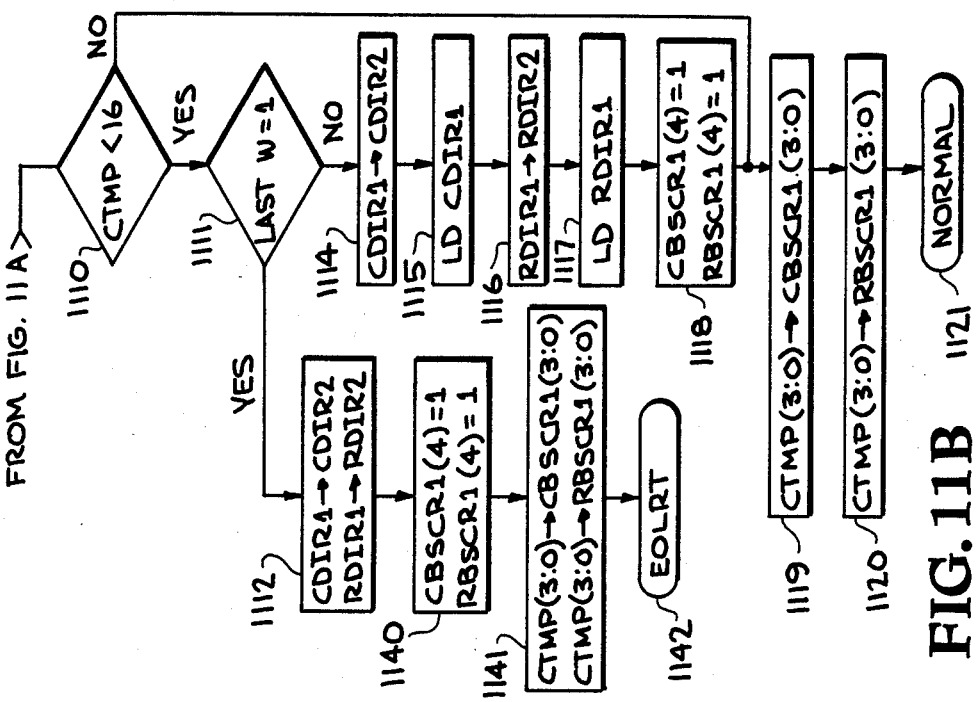
Figure 12:
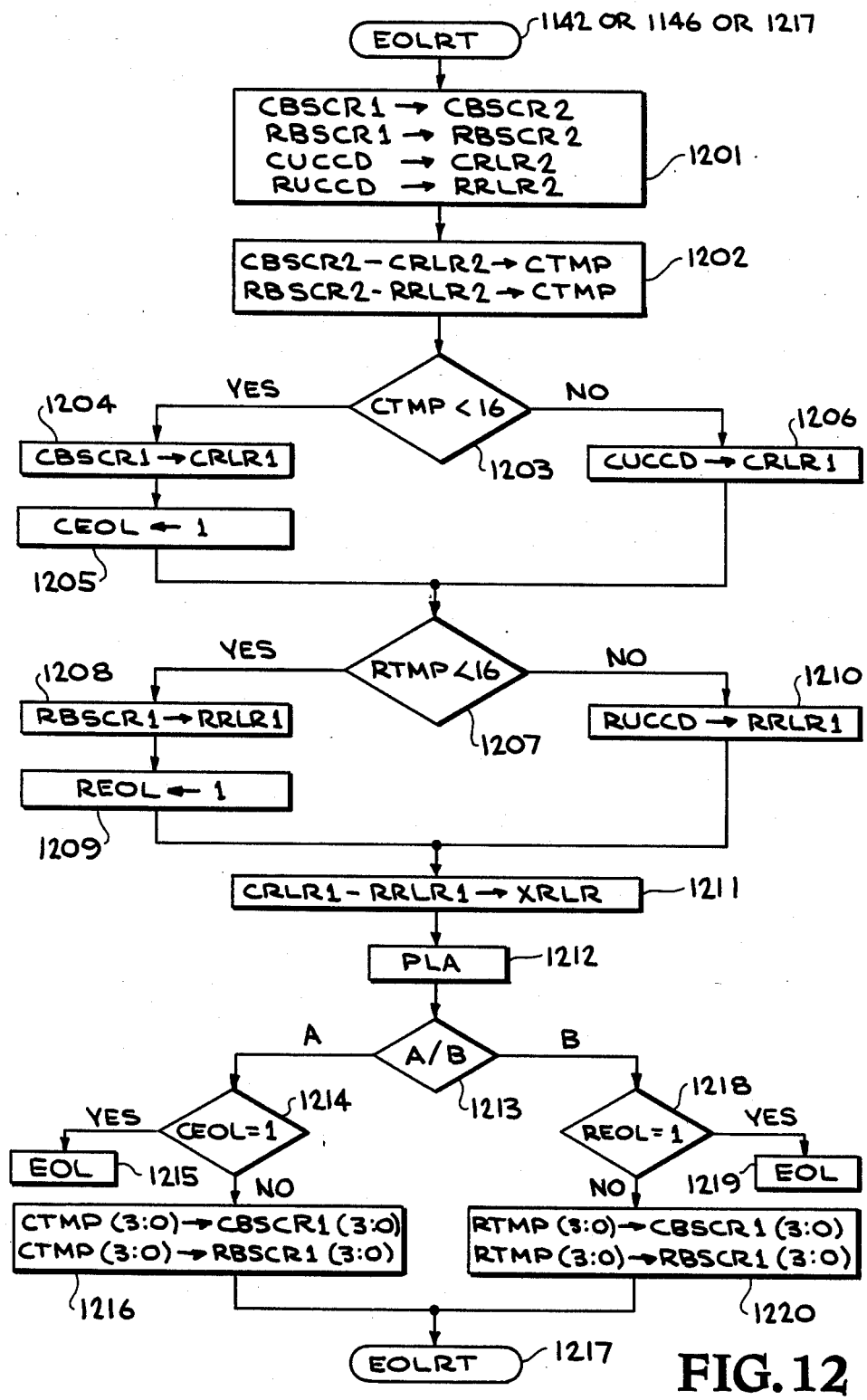
FIG. 12 is a flow chart illustrating the encoding of a last word of pixel data in a scan line.

FIGS. 11A through 11C and 12 are flow charts illustrating the sequence of operation of the compression engine shown in FIGS. 2A through 2C. FIGS. 11A through 11C illustrate the normal operation of the compression engine while encoding a line of data from a facsimile. FIG. 12 is a routine implemented for encoding the final word of a line of data.

FIGS. 11A–11C illustrates the normal operation of the compression engine. In the normal routine, 32 bits of picture element data are in the barrel shifter 204. The information in the CBSCR1 and the RBSCR1 determine the window of picture element data to be used in the generation of the intermediate code. The unidirectional color change detectors CUCCD 215 and RUCCD 216 detect the position of the first desired color changing element for the coding portion of the window and the reference portion of the window as discussed above. The first step of the normal routine begins with loading the value of the CBSCR1 through multiplexer 298 to the CBSCR2 (block 1101). Next, the output of the coding window unidirectional color change detector CUCCD 215 is loaded to CRLR1 219 and CRLR2 220 (block 1102). Likewise, RBSCR1 is transferred through multiplexer 280 to RBSCR2 (block 1103). The next step involves loading the output of the reference line unidirectional color change detector RUCCD 216 to RRLR1 221 and RRLR2 222 (block 1104). The ALU 245 subtracts the contents of CRLR2 from CBSCR2 and loads the results to CTMP block 1105). Likewise, the ALU 255 subtracts the value of RRLR2 from RBSCR2 and loads the results to RTMP (block 1106). Next, the ALU 224 subtracts the value of RRLR1 from CRLR1 and loads the results to the XRLR register (block 1107). The programmable logic array then executes generating an intermediate code as discussed above (block 1108). Depending on the value of the A/B signal on line 238, one of two branches is taken (block 1109).

If the A/B signal indicates selection of the A value—the contents of CTMP—for the next window control signals, then the next block tests whether the value of CTMP is less than 16 (block 1110 in FIG. 11B). If the value is not less than 16, then the branch to block 1119 is taken. Otherwise, the next step is block 1111 in which a control signal called "last W" is checked. The input data stream will signal the compression engine when the last word in a line is sent by assertion of the "last W" bit which is tested in block 1111. If the last W bit is true, the contents of CDIR1 are shifted to CDIR2 and the contents of RDIR1 are shifted to RDIR2 in preparation for the end of line routine (block 1112). In the next step, the fourth bit of CBSCR1 and the fourth bit of RBSCR1 are both set to 1 (block 1140). Next the 4 rightmost bits of CTMP are shifted to the 4 rightmost positions in CBSCR1 and to RBSCR1 (block 1141). Then the end of line routine is entered (block 1142). The end of line routine is described with reference to FIG. 12.

If the last W signal has not been asserted in block 1111, the next step involves shifting the contents of CDIR1 into CDIR2 (block 1114). Next, the contents of CDIR1 are loaded with a following word (block 1115). Likewise, the contents of RDIR1 are shifted into RDIR2 (block 1116) and a new word is loaded into RDIR1 (block 1117). This action assures that there are always 32 bits of data for the barrel shifter to select 16 bits out of them. In the next block, the most significant bit in CBSCR1 and RBSCR1 are set to 1. This action is taken in order to assure that the beginning of window selected by the barrel shifter is always located between bit 31 and bit 16 for the 32 bits of data in the CDIR1 and CDIR2 (or RDIR1 and RDIR2).

In the next block, the 4 rightmost bits in CTMP are loaded to the 4 rightmost positions in CBSCR1 (block 1119). Also, the 4 rightmost bits in CTMP are loaded to RBSCR1 (block 1120). Finally, the loop returns to the beginning of the normal processing (block 1121).

If in block 1109, the window control signal is asserted to select the B value RTMP, then the next block is 1122 (FIG. 11C). In block 1122, RTMP is tested to determine whether it is less than 16. If RTMP is not less than 16, then a branch is taken to block 1129. If RTMP is less than 16, the last W flag is tested. If the last word flag has been asserted, a branch is taken to block 1143 where CDIR1 is shifted to CDIR2 and RDIR1 is shifted to RDIR2. Next, the fourth bit position in both RBSCR1 and CBSCR1 is set to 1 (block 1144). Next, the 4 rightmost bits in RTMP are shifted to the 4 rightmost positions in CBSCR1 and RBSCR1 (block 1145). Finally, the end of line routine is entered in block 1146.

If the last W flag is not asserted, then the value of CDIR1 is loaded to CDIR2 (block 1124). Next, a new word is loaded into CDIR1 (block 1125). Likewise, the value in RDIR1 is loaded to RDIR2 (block 1126) and a new word is loaded into RDIR1 (block 1127). This action assures that there are always 32 bits of data for the barrel shifter to select a 16-bit window segment.

Also, the most significant bits in CBSCR1 and RBSCR1 are set to 1 to assure that the beginning of window selected by the barrel shifters is always located between bit 31 and bit 16 for the 32 bits of data in the CDIR1 and CDIR2 (or RDIR1 and RDIR2). (block 1128). Next, the 4 rightmost bits in RTMP are loaded to the 4 rightmost positions in CBSCR1 (block 1129) and in RBSCR1 (block 1130). After loading CBSCR1 and RBSCR1 in blocks 1129 and 1130, the loop returns to the beginning of normal processing, block 1121.

FIG. 12 illustrates the end of line routine EOLRT. As mentioned above, the end of line routine is entered from blocks 1142 or 1146 in FIG. 11B or FIG. 11C. The first step of the end of line routine involves shifting CBSCR1 to CBSCR2, RBSCR1 to RBSCR2, CUCCD to CRLR2, and RUCCD to RRLR2 (block 1201). Next, the difference between CBSCR2 and CRLR2 are loaded to CTMP, and the difference between RBSCR2 and RRLR2 is loaded to RTMP (block 1202). Next, the routine determines whether the value in CTMP is less than 16 (block 1203). If CTMP is less than 16, the value in CDSCR1 is shifted to CRLR1 (block 1204) and a coding end of line flag CEOL is set to 1 (block 1205). If the value in CTMP was not less than 16 in block 1203, then the value of CUCCD is shifted to CRLR1 (block 1206).

After block 1205 or block 1206, then the value in RTMP is tested in block 1207 to determine whether it is less than 16. If RTMP is less than 16, then the value in RBSCR1 is shifted to RRLR1 (block 1208) and a reference end of line flag REOL is set to 1 (block 1209). If the value in RTMP in block 1207 was not less than 16, then the contents of RUCCD is shifted to RRLR1 (block 1210).

After blocks 1209 or 1210, the value X is calculated by loading the difference between CRLR1 and RRLR1 to the register XRLR (block 1211). Next, the programmable logic array executes a state function (block 1212). In the state function the A/B signal is asserted (block 1213). If the A/B signal asserts the value A, then the CEOL flag is tested (block 1214). If the CEOL flag is 1, then an end of line code is asserted (block 1215). If the CEOL flag is not 1, then the 4 rightmost positions in CTMP are shifted to the 4 rightmost positions in CBSCR1 and RBSCR1 (block 1216). Then the end of line routine is entered again from block 1217.

If the A/B signal in block 1213 asserted the value B, then the REOL is tested in block 1218. If the REOL flag is equal to 1, then an end of line code is generated in block 1219. If the REOL flag is not equal to 1, then the 4 rightmost bits in RTMP are shifted to the 4 rightmost positions in CBSCR1 and in RBSCR1 (block 1220). Next, the end of line routine is re-entered from block 1217.

CONCLUSION

The present invention performs two-dimensional facsimile coding generally based upon the international standards. However, the present invention offers a large improvement in speed over the prior art. This invention also presents a very compact architecture that permits the realization of the coding device in an integrated circuit using the current VLSI technology.

The present invention uses coding windows and color change codes instead of binary pictures for the state machine. A novel unidirectional color transition detector is used to detect the color transition location either from white to black or from black to white according to a selectable color flag, and converts the detected color transition location to a color change code. For example, a 16 picture element data can be converted to a 4 bit color change code. Therefore, more data can be processed at one time. Moreover, states of the state machine in the present invention contain information of the color change location instead of information of prior picture element data. Also, the state machine supplies the window movement information to control the barrel shifter to shift the coding window to the next color change location instead of shifting bit by bit.

In the prior art all the color changing elements a0, a1, a2, b1 and b2 are referred to a reference point at the beginning of each scan line. For this reason, the prior art requires at least an ALU for accumulating color changing run-lengths to get the next color changing element. The present invention uses two equal length registers holding selected portions of the coding line and reference line. The selected portions of the reference and coding lines in the window are always shifted to the same location simultaneously and all color changing elements are referred to the beginning of window instead of the beginning of line. Therefore, no ALU is necessary for the detection of a1, a2, b1 and b2 in the present invention. Further, all the comparison and calculation of the relative distances between those color changing elements are replaced by the state machine. The present invention thus can achieve very high speed coding with a compact architecture.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. An apparatus for encoding a facsimile of a graphic image, the facsimile being represented by a plurality of scan lines, each scan line being represented by a plurality of picture elements, each picture element being characterized by pixel data indicating a color of the picture element, comprising:
    windowing means, connected to receive pixel data characterizing picture elements from a coding line and from a reference line of the facsimile and responsive to window control signals, for selecting a window of pixel data;
    means, coupled to the windowing means and responsive to the selected window of pixel data, for generating intermediate codes and the window control signals; and
    coding means, coupled to the means for generating and responsive to the intermediate codes, for supplying codes that encode the facsimile.

2. The apparatus of claim 1, wherein the facsimile includes a number m of scan lines $L_i$, for i equal to 1 through m, and a number n of picture elements $P_j$, for j equal to 1 through n in a scan line, and the coding line equals $L_i$ and the reference line equals $L_{i-1}$, for encoding the coding line $L_i$, for i equal to 2 through n.

3. The apparatus of claim 2, wherein the windowing means includes:
    means for selecting a window of pixel data including picture elements $P_j$ through $P_M$, where M is a constant less than m and j is selected from 1 to m in response to the window control signals, from lines $L_i$ and $L_{i-1}$ for encoding the coding line $L_i$, for i equal to 2 through n.

4. The apparatus of claim 1, wherein the means for generating includes:
    means, connected to the windowing means, for generating color change signals indicating the position of color changing picture elements in the coding line and in the reference line within the selected window; and
    means, connected to receive the color change signals, for generating an intermediate code for the selected window and window control signal identifying the next window to be selected.

5. The apparatus of claim 4, further including:
    means, in communication with the means for generating color change signals and the means for generating intermediate codes, for accumulating and storing run lengths in the coding line of picture elements with no color change; and
    means for supplying the run lengths stored to the coding means.

6. The apparatus of claim 5, wherein the coding means supplies a code according to an industry standard for facsimile encoding.

7. The apparatus of claim 1, wherein the means for generating includes:
    means, connected to the windowing means, for generating color change signals indicating the position of color changing picture elements in the coding line pixel data and in the reference line pixel data within the selected window; and
    means, connected to receive the color change signals, for generating an intermediate code and a select shift signal for the selected window;
    means, connected to receive the color change signals, for generating a coding line window shift signal and a reference line window shift signal for the selected window; and
    means, connected to receive the coding line window shift signal, the reference line window shift signal and the select shift signal, for supplying either the coding line window shift signal or the reference line window shift signal as a window control signal identifying the next window to be selected.

8. The apparatus of claim 7
    means, in communication with the mans for generating color change signals and the means for generating intermediate codes, for accumulating and storing run lengths in the coding line of picture elements with no color change
    means for supplying the run lengths stored to the coding means.

9. The apparatus of claim 8, wherein the coding means supplies a code according to an industry standard for facsimile encoding.

10. The apparatus of claim 1, wherein the coding means supplies a code according to an industry standard for facsimile encoding.

11. An apparatus for encoding a facsimile of a graphic image, the facsimile being represented by a plurality of scan lines, each scan line being represented by a plurality of picture elements, each picture element being characterized by pixel data indicating a color of the picture element, comprising:

input means, connected to receive pixel data characterizing picture elements from a coding line and a reference line of the facsimile, for storing a window of pixel data from the coding line and the reference line;

means, connected to the input means and responsive to a coding line color change flag and a reference line color change flag, for generating color change signals indicating the position of a first color changing picture element in the coding line within the window and a first color changing picture element in the reference line within the window, the first color changing picture element being defined as a picture element whose color is different from a preceding picture element and matches the respective color change flag;

means, coupled to the means for generating color change signals and responsive to the color change signals, for generating intermediate codes and the coding line color change flag and the reference line color change flag; and coding means, coupled to the means for generating intermediate codes and responsive to the intermediate codes, for supplying codes that encode the facsimile.

12. The apparatus of claim 11, wherein the facsimile includes a number m of scan lines $L_i$, for i equal to 1 through m, and a number n of picture elements $P_j$, for j equal to 1 through n in a scan line, and the coding line equals $L_i$ and the reference line equals $L_{i-1}$, for encoding the coding line $L_i$, for i equal to 2 through n.

13. The apparatus of claim 12, means, in communication with the means for generating color change signals and the means for generating intermediate codes, for accumulating and storing run lengths in the coding line of picture elements with no color change means for supplying the run lengths stored to the coding means.

14. The apparatus of claim 11, further including:

means, in communication with the means for generating color change signals and the means for generating intermediate codes, for accumulating and storing run lengths in the coding line of picture elements with no color change and means for supplying the run lengths stored to the coding means.

15. An apparatus for encoding a facsimile of a graphic image, the facsimile being represented by a plurality of scan lines, each scan line being represented by a plurality of picture elements, each picture element being characterized by pixel data indicating a color of the picture element, comprising:

windowing means, connected to receive pixel data characterizing picture elements from a coding line and from a reference line of the facsimile and responsive to window control signals, for selecting a window of pixel data from the coding line and the reference line;

means, connected to the windowing means and responsive to a coding line color change flag and a reference line color change flag, for generating color change signals indicating the position of a first color changing picture element in the coding line within the window and a first color changing picture element in the reference line within the window, the first color changing picture element being defined as a picture element whose color is different from a preceding picture element along the same line and matches the respective color change flag;

logic means, coupled to the means for generating color change signals and responsive to the color change signals, for generating intermediate codes, the coding line color change flag, the reference line color change flag and the window control signals; and coding means, coupled to the logic means and responsive to the intermediate codes, for supplying codes that encode the facsimile.

16. The apparatus of claim 15, wherein the facsimile includes a number m of scan lines $L_i$, for i equal to 1 through m, and a number n of picture elements $P_j$, for j equal to 1 through n in a scan line, and the coding line equals $L_i$ and the reference line equals $L_{i-1}$, for encoding the coding line $L_i$, for i equal to 2 through n.

17. The apparatus of claim 15, wherein the windowing means includes:

means for selecting a window of pixel data including picture elements $P_j$ through $P_M$, where M is a constant less than m and j is selected from 1 to m in response to the window control signals, from lines $L_i$ and $L_{i-1}$ for encoding the coding line $L_i$, for i equal to 2 through n.

18. The apparatus of claim 15, wherein the logic means includes;

means, connected to receive the color change signals, for generating a select shift signal for the selected window;

means, connected to receive the color change signals, for generating a coding line window shift signal and a reference line window shift signal for the selected window; and means, connected to receive the coding line window shift signal, the reference line window shift signal and the select shift signal, for supplying either the coding line window shift signal or the reference line window shift signal as a window control signal identifying the next window to be selected.

19. The apparatus of claim 15, further including:

means, in communication with the means for generating color change signals and the logic means, for accumulating and storing run lengths in the coding line of picture elements with no color change and means for supplying the run lengths stored to the coding means, 20. The apparatus of claim 19, wherein the coding means supplies a code according to an industry standard for facsimile encoding.

* * * * *

UNITED STATES PATENT AND TRADEMARK OFFICE
CERTIFICATE OF CORRECTION

PATENT NO. : 4,807,043

DATED : February 21, 1989

INVENTOR(S) : Shinkyo Kaku and Chung-Li Yu

It is certified that error appears in the above-identified patent and that said Letters Patent is hereby corrected as shown below:

Column 10, line 39: "ad 228." should be -- and 228. --

Column 11, line 65: "lines are" should be --lines 213 are --

Column 11, line 66: "circuit include" should be
                    -- circuit 400 include --

Column 19, line 13: "(al - bl) > 2)," should be
                    -- (al - bl) > 3), --

Column 24, line 54:
was CLAIM 7, NOW CLAIM 8: "the mans for" should be
                          -- the means for --

Column 26, line 38: "of claim !5" should be -- of claim 15 --

Signed and Sealed this

Twenty-first Day of November, 1989

*Attest:*

JEFFREY M. SAMUELS

*Attesting Officer*   *Acting Commissioner of Patents and Trademarks*